(12) United States Patent
Sadeddin et al.

(10) Patent No.: US 11,775,986 B1
(45) Date of Patent: Oct. 3, 2023

(54) SECURE FACILITATION OF VIRTUAL CARD ACTIVITIES FOR PROCUREMENT

(71) Applicant: Coupa Software Incorporated, San Mateo, CA (US)

(72) Inventors: Ahmad Sadeddin, Daly City, CA (US); Tushar Rawal, San Mateo, CA (US); Alan Cima, San Carlos, CA (US); Rohit Jalisatgi, Dublin, CA (US); Rajiv Ramachandran, San Ramon, CA (US)

(73) Assignee: Coupa Software Incorporated, San Mateo, CA (US)

( * ) Notice: Subject to any disclaimer, the term of this patent is extended or adjusted under 35 U.S.C. 154(b) by 552 days.

(21) Appl. No.: 15/930,170

(22) Filed: May 12, 2020

(51) Int. Cl.
| | |
|---|---|
| G06Q 30/00 | (2023.01) |
| G06Q 30/018 | (2023.01) |
| G06Q 20/10 | (2012.01) |
| G06Q 50/26 | (2012.01) |
| G06Q 40/02 | (2023.01) |
| H04L 9/40 | (2022.01) |
| G06Q 20/32 | (2012.01) |
| G06Q 30/0601 | (2023.01) |
| G06Q 20/40 | (2012.01) |
| G06F 21/62 | (2013.01) |
| G06Q 20/34 | (2012.01) |

(52) U.S. Cl.
CPC ..... G06Q 30/0185 (2013.01); G06F 21/6245 (2013.01); G06Q 20/108 (2013.01); G06Q 20/3274 (2013.01); G06Q 20/34 (2013.01); G06Q 20/4016 (2013.01); G06Q 30/0633 (2013.01); G06Q 40/02 (2013.01); G06Q 50/265 (2013.01); H04L 63/1425 (2013.01)

(58) Field of Classification Search
CPC .......... G06Q 30/0635; G06Q 30/0605; G06Q 30/0601; G06Q 40/02; G06Q 30/0185; G06Q 50/28; G06Q 30/02; G06Q 40/00; G06Q 20/38; G06Q 10/00; G06F 21/40; G06F 9/451
USPC .............................. 705/26.1, 26.2, 26.35, 41
See application file for complete search history.

(56) References Cited

U.S. PATENT DOCUMENTS

| | | | | |
|---|---|---|---|---|
| 10,896,430 | B1* | 1/2021 | Harris | G06Q 30/0185 |
| 11,017,464 | B1* | 5/2021 | Harris | H04L 63/1416 |
| 11,019,090 | B1* | 5/2021 | Smith | G06F 21/40 |
| 2002/0046169 | A1* | 4/2002 | Keresman, III | G06Q 40/00 |
| | | | | 705/26.1 |

(Continued)

*Primary Examiner* — Olusegun Goyea
(74) *Attorney, Agent, or Firm* — Baker Botts L.L.P.

(57) ABSTRACT

A method and apparatus for facilitating the utilization of virtual payment card data is provided. In various embodiments, virtual payment card data is received by a centralized e-procurement service directly from buyer or issuer entities participating in the service. In various embodiments, secure processes protect the security of virtual payment card data on the centralized service by actively monitoring the service for abnormal view and access behaviors of the virtual payment card data. In various embodiments, viewing interfaces for the e-procurement service are actively and responsively altered to ensure secure utilization of the virtual payment card data. In various embodiments, preventative actions are taken to actively alter virtual payment card data or access methods for entities utilizing the e-procurement service to protect the integrity and security of virtual payment card data.

19 Claims, 16 Drawing Sheets

(56) References Cited

U.S. PATENT DOCUMENTS

| | | | |
|---|---|---|---|
| 2014/0258032 A1* | 9/2014 | Psota | G06Q 30/0609 |
| | | | 705/26.35 |
| 2015/0073929 A1* | 3/2015 | Psota | G06Q 30/0605 |
| | | | 705/26.2 |
| 2019/0180290 A1* | 6/2019 | Jubete | G06F 9/451 |
| 2019/0220859 A1* | 7/2019 | Weight | G06Q 20/3823 |
| 2020/0074515 A1* | 3/2020 | Ghatage | G06F 40/58 |
| 2020/0118137 A1* | 4/2020 | Sood | G06Q 10/00 |

\* cited by examiner

210 Maintain a software service that is programmed for facilitating procurement transactions between a buyer account and a supplier account 220 Receive virtual payment card data sufficient to uniquely identify a particular payment method associated with a buyer account 230 Receive a request to access the virtual payment card data associated with the method of purchase 240 Store visual virtual payment card data corresponding to a visual representation of the virtual payment card data in a secure storage memory 250 Provide access to the secure storage memory

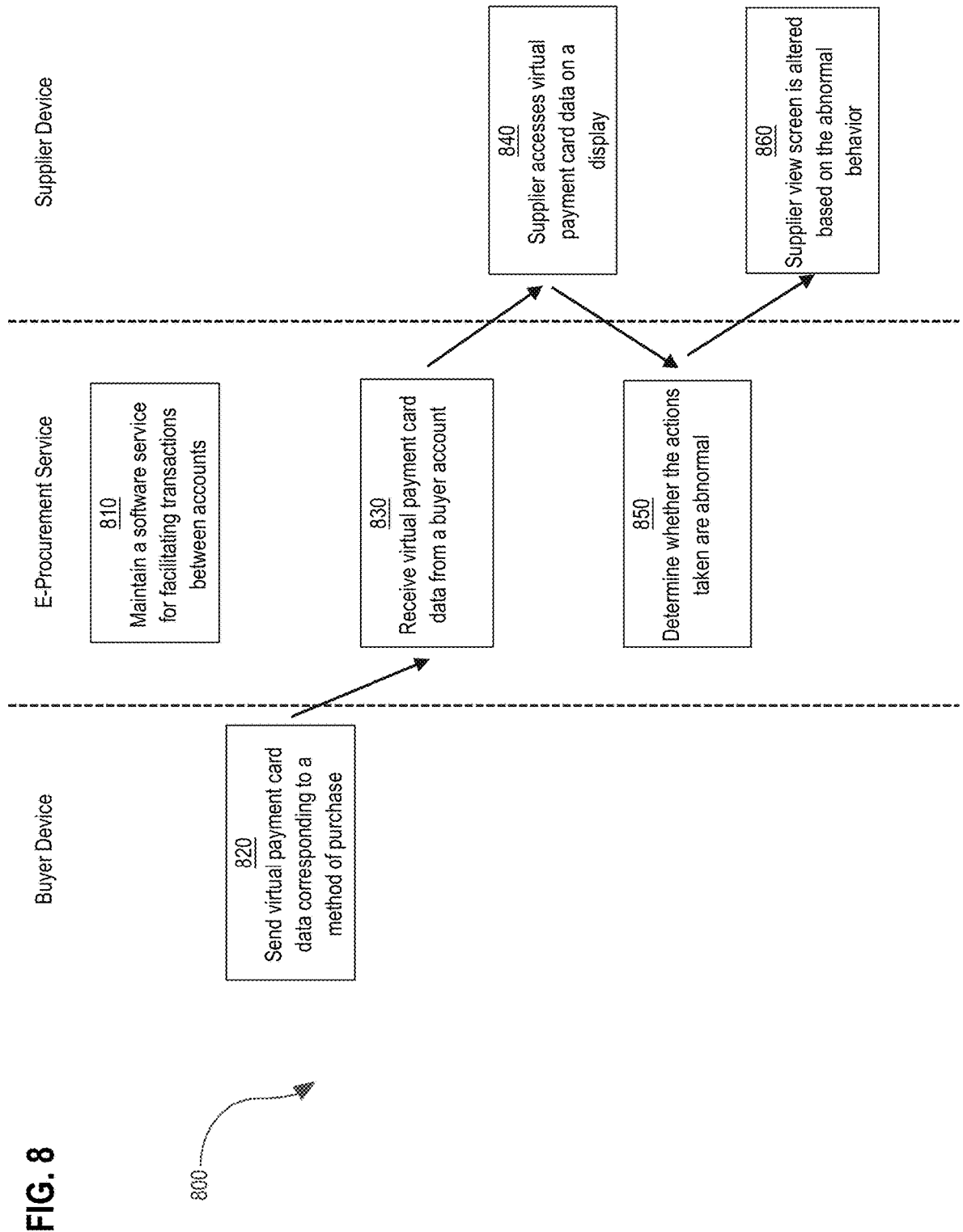

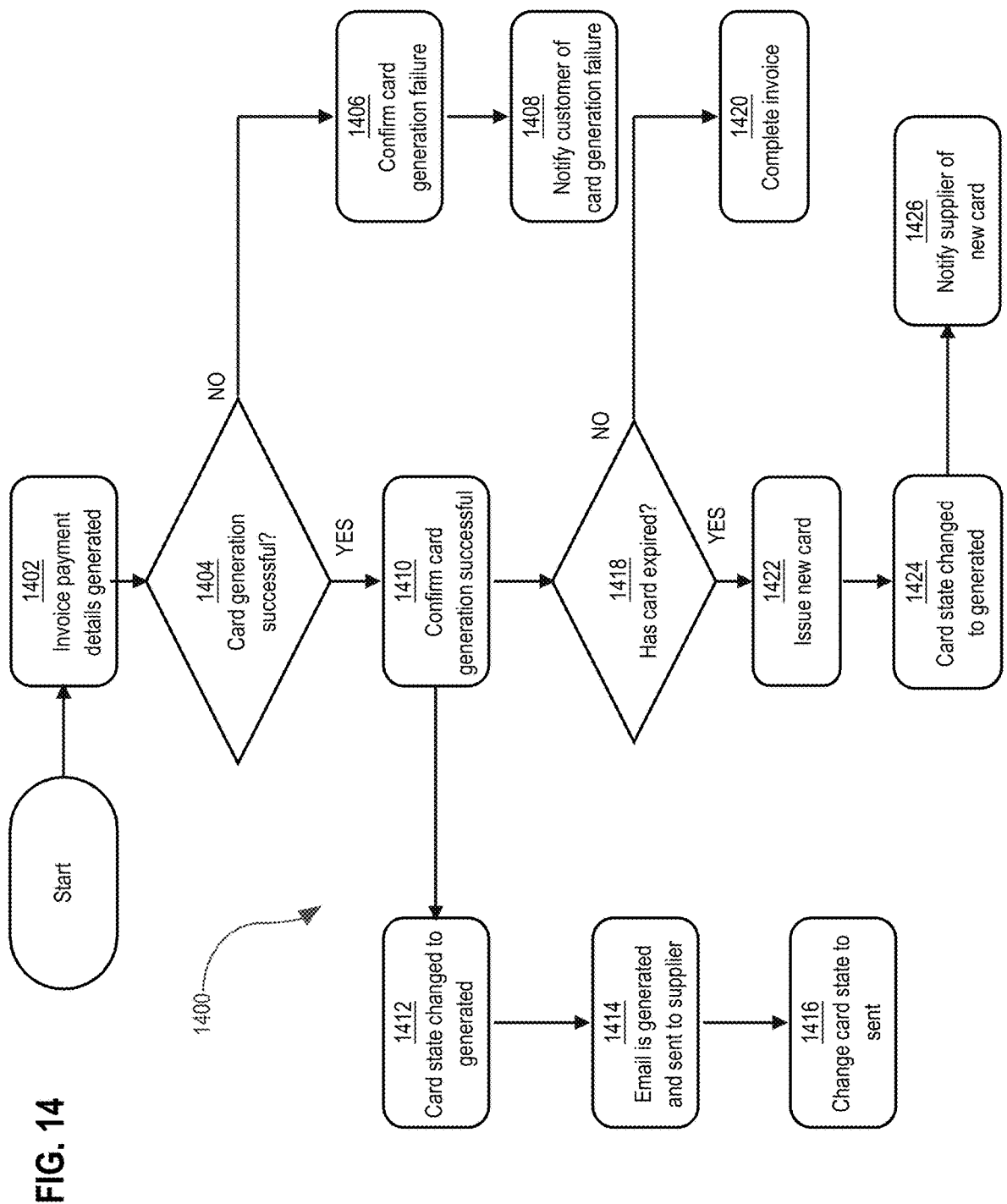

SECURE FACILITATION OF VIRTUAL CARD ACTIVITIES FOR PROCUREMENT

FIELD OF THE DISCLOSURE

One technical field of the present disclosure is distributed computer systems in the field of electronic procurement including computer-implemented processes for securely receiving and viewing sensitive transactional information. Another technical field is fraud detection based on interaction abnormalities and security model training. Another technical field is graphical user interface manipulation based on software security considerations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

E-procurement technologies involve digital or electronic marketplaces where buyers and suppliers interact digitally to participate in the exchange of goods and services for financial compensation. E-procurement may involve interaction between an individual buyer and seller, or supplier, through an intermediary service, such as a software platform. As an example, procurement refers to a process whereby a buyer member of an organization submits a requisition, or purchase order, to obtain an item from a supplier. These procurements utilize a third-party intermediary service to allow communication between buyers and sellers, and well as handle the exchange of financial compensation and provide logistic information to fulfill the requisition.

To facilitate e-procurement transactions, a buyer must present a supplier with digital currency information, often in the form of a virtual payment method or image. The buyer may procure virtual payment information representing a purchase method, which is subsequently presented to the supplier in order to generate purchase orders and invoices for the supplier's provided goods and/or services. Virtual payment information allows the buyer to quickly and conveniently convey a viable purchase method to the supplier and facilitate an efficient transaction. Such information corresponding to a buyer's account is often originally generated and distributed by financial service providers holding accounts for the buying entities, such as banks and credit card distributors. The virtual payment information corresponds to a line of credit or an account owned by the buyer, and can be charged using the information contained therein.

Presently, virtual payment information for use in e-procurement processes is distributed through highly informal and risky channels. For example, popular methods of distributing virtual payment information include unsecured email messages, electronic chats, image files and other simple conveyances of highly sensitive information. By the time the virtual payment information is finally charged, and the account is closed, the information has been transferred and/or used multiple times by multiple entities, potentially causing serious breaches of security, as well as the loss of important computer resources before from all parties. For example, a single transaction for a non-vital item may cause virtual payment information to "hop" from a bank, to a secure payment processor, to a buyer account, to an e-procurement service, to a supplier, and between these many entities multiple times subsequently. Each "hop" is a dangerous opportunity for malicious actors to intercept sensitive data and wastes valuable computer resources for each party.

While virtual payment information is very convenient for use in digital transactions, it is very susceptible to fraudulent activities and interception by these dangerous third parties. For example, malicious actors may intercept any of the multitude of communications between the parties and utilize information for their own personal gain, much to the detriment of the buyer, issuing entity, seller, and even the intermediary service. Malicious actors with unauthorized access to buyer and supplier accounts may view the information illegally, and in some cases may view multiple disparate instances of virtual payment data, causing harm to multiple legitimate accounts utilizing the e-procurement service legally. Malicious actors may pose as legitimate buyers or suppliers in the e-procurement service to entrap other entities into sharing this sensitive financial information. The high rate of information transmission as well as the lack of responsive security measures associated with contemporary virtual payment information increases the risk that regular and legitimate e-procurement activities will be misappropriated by these malicious actors.

SUMMARY

The appended claims may serve as a summary of the invention.

BRIEF DESCRIPTION OF THE DRAWINGS

In the drawings:

FIG. 2 illustrates a virtual payment security process according to various embodiments.

FIG. 8 illustrates a virtual payment security system according to various embodiments.

FIG. 14 illustrates an example flow diagram for processing a requisition invoice using virtual payment card data.

DETAILED DESCRIPTION

Figure 1:
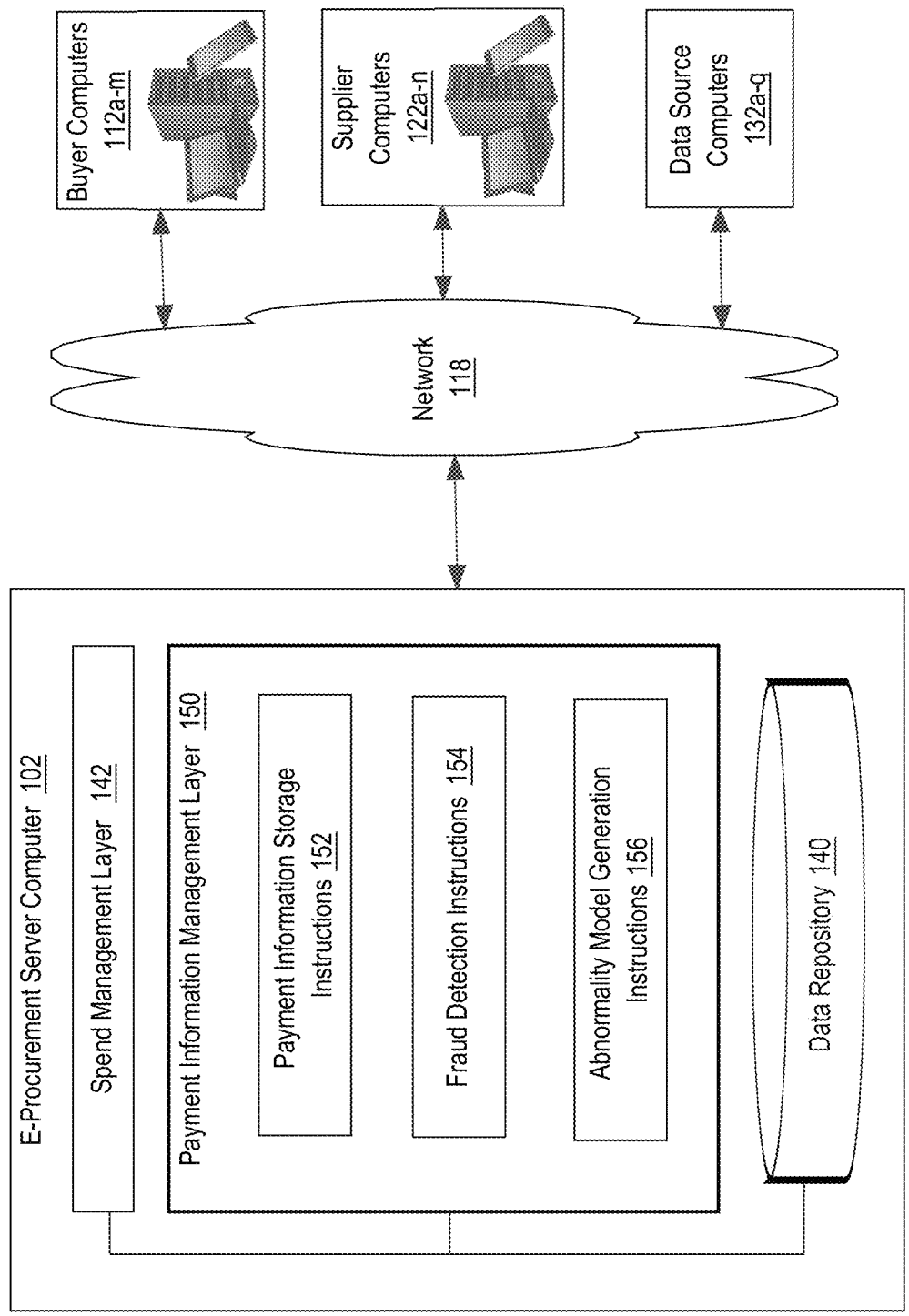
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. EXAMPLE COMPUTING ENVIRONMENTS AND COMPUTER COMPONENTS
3. EXAMPLE PROCESSES FOR SECURE FACILITATION OF VIRTUAL PAYMENT CARD DATA
3.1 VIEWING VIRTUAL PAYMENT CARD DATA IN SECURE ENVIRONMENTS
3.2 ALTERING A GRAPHICAL USER INTERFACE FOR VIEWING VIRTUAL PAYMENT CARD DATA
3.3 PREVENTING ACCESS TO VIRTUAL PAYMENT CARD DATA IN A SYSTEM
3.4 GENERATING A MODEL FOR ABNORMAL BEHAVIORS USING COMMUNITY ACTIVITY DATA
3.5 FACILITATING A PURCHASE ORDER USING VIRTUAL PAYMENT CARD DATA
3.6 RESOLVING A PROCUREMENT INVOICE USING VIRTUAL PAYMENT CARD DATA
4. HARDWARE AND SOFTWARE OVERVIEW
5. PRACTICAL APPLICATIONS

1. General Overview

In various embodiments, a computer implemented method facilitates the use and manipulation of digital transaction data to be used in an e-procurement software service. The transaction data may be any data sufficient to convey virtual payment information, such as virtual payment card data representing a digital copy of a credit card, debit card, bank account, credit line, or other method of transaction. The virtual payment card data may be reference data or identification data which corresponds to an account or account data that is separately stored by a payment issuer. The virtual payment card data may be received by the e-procurement service and associated with a buyer's account to complete a procurement of an item or service from a supplier. The e-procurement service may store the virtual card data in a secure location to prevent malicious and irregular accesses to the data. The virtual card data may then be used some time later to access payment account information from a third party issuer, such as a bank, lender, credit card suppliers, payment service, or some other third party entity.

A supplier account and the buyer account may be permitted a certain level of access to the data through the e-procurement service, under program control. Certain actions detected by the e-procurement service on the part of either account support the recognition of a malicious or potentially hazardous action by the accounts or a third party. The e-procurement service may perform certain actions to ensure viewing and utilization activities are performed in a safe, secure, and reasonable manner. As emergencies arise, such as imminent or present dangers to the security of virtual payment card data, the e-procurement service may take responsive restrictive actions to protect the integrity and security of the data.

In various embodiments, a computer-implemented method may be utilized to maintain, on a computing device, a software service that is programmed for facilitating procurement transactions between a buyer account and a supplier account, such as an e-procurement service. The method may further receive, from the buyer account at the software service, virtual payment card data, the virtual payment card data sufficient to uniquely identify a particular payment method associated with a buyer account. Virtual payment card data may be any type of data corresponding to a method of payment and in many embodiments is utilized by the buyer account to request a procurement of items through the e-procurement service. At some time after the virtual payment card data is received, the method may cause receiving, from the supplier account at the software service, a request to access the virtual payment card data associated with the method of purchase.

The request to access the virtual payment card data is associated with a supplier's desire to complete a transaction or procurement request by receiving payment for services rendered. Payment may be done in a context of prepayment for procurement, payment for a procurement already completed, or a regular milestone payment as part of ongoing procurements, services, or billing cycles. Access of the data should be performed in a secure environment on the e-procurement service to prevent and/or more easily detect fraudulent activity. The method may facilitate storing, in a secure storage memory of the software service, visual virtual payment card data corresponding to a visual representation of the virtual payment card data. The visual virtual payment card data may be data in a visual format which can convey details of the virtual payment card to a supplier entity accessing the data. The method may subsequently provide, to the supplier account, access to the secure storage memory so that the supplier entity can access the visual information necessary to facilitate an e-procurement action in a secure and safe manner.

Even in a secure environment, viewing activities should be monitored by the e-procurement service for abnormal activity. In various embodiments, a computer-implemented method may store, by the software service, the virtual payment card data, the virtual payment card data sufficient to uniquely identify a particular payment method or payment data associated with a buyer account. Such information may be used to identify other data, such as third party data relating to purchase accounts or data which may be accessed to facilitate or complete a procurement process. At some time after storing the virtual payment card data, the method may cause receiving, from the supplier device, a request to view the virtual payment card data. Viewing the virtual payment card data may be necessary for a supplier to complete various actions, such as verifying payment data, facilitating an e-procurement request, or updating payment information associated with the buyer account. The method may cause displaying, on the screen of the supplier device, visual virtual payment card data corresponding to the virtual payment card data in a first visual state in order to allow the supplier to see the data in an appropriate visual format.

Certain supplier actions, however, may indicate the presence of a malicious actor or risky behavior by the viewing supplier. The method may then cause determining, by the software service, one or more abnormal behaviors has occurred during the viewing of the information. Potentially dangerous viewing behaviors may include, for example, detecting that the visual information has been on the viewing screen for an inordinately long amount of time, detecting a screenshot has been taken of the visual information, or determining that a supplier device showing the visual information is in direct communication with another unpermitted device. As a result of the detection of abnormal viewing behaviors, the method may subsequently cause a visual alteration to appear on the display of the supplier device, the visual alteration comprising a change of the virtual payment card data into a second visual state that is different from the first visual state. The change may comprise alterations such as the removal of certain card information from the screen, a blacking-out of all data shown, or an obfuscation of certain portions of the visual information for an indefinite period of time.

In situations where the security and safety of virtual payment card information are at risk, immediate preventative action should sometimes be taken. In various embodiments, a computer-implemented method may store, by a software service executing on a computing device, virtual payment card data, the virtual payment card data sufficient to uniquely identify a particular payment method associated with a buyer account. Once the data is stored, the method may later detect, using the software service, one or more access actions by a supplier account involving the virtual payment card data. Some access actions may be permissive in the course of regular activity for the e-procurement service, but others may indicate the presence of malicious actors, such as attempts to charge inordinate sums during transactions, or charging a high volume of transactions over a short period of time. In these cases, immediate protection of the buyer account and the virtual payment card data is imperative to prevent further security problems.

During an access action, the computer-implemented method may detect, using the software service, that the one or more access actions by the supplier account correspond to one or more abnormal access behaviors. In response to determining the existence of an abnormal access behavior, the method may cause responsive preventing, by the software service, of access to the virtual payment card data. Prevention of access may comprise a number of security preserving actions, such as revocation of security credentials for the supplier, removal of permissive association between the supplier and the card data, or complete voiding of a virtual payment card account in the e-procurement service.

The computer-implemented methods described above facilitates an e-procurement service which can intake virtual transaction data from issuing entities and securely utilize that data to permit procurements and transactions. Reducing the use of unsecured communication mediums between buyers, suppliers, and issuing entities reduces potential security hazards in e-procurement processes. Such methods further improve e-procurement processes by utilizing a central service structure to handle secure virtual payment data. Furthermore, the computer-implemented methods described herein improve security interactions associated with the e-procurement service by responsively acting when abnormal activity is presented. Previous methods of detecting abnormal activity were human-determined and resolved manually by administrators of the service. Modifying visual information and redacting of access privileges in critical situations allow an e-procurement service to more efficiently handle current and future security hazards without inefficient human-required determinations. Furthermore, the recognition and resolution of hazards in the manners described herein allows an e-procurement service to facilitate building efficient detection and actions models for continuously improving security on the e-procurement platform.

Computing resources are more efficiently utilized by an e-procurement service implementing the techniques or methods described herein. For example, previous methods of generating and storing virtual payment card data require a multitude of independent resource "hops" comprising sending the same data back and forth. Beyond the described issues with security, frequent data jumps between entities greatly tie up computing resources as important data is sent back and forth. Encrypting data for security purposes made such communications even more inefficient, causing payment data issuers to sacrifice either security or efficiency for the sake of the other. Centralization of virtual payment card data on the e-procurement service allows data to be sent and stored in a minimal and efficient manner, allowing critical resources to be better utilized while improving service security at the same time. Automatic detection and resolution of abnormal access behaviors for virtual payment card data also removes intensive and inefficient obsolete computing processes which were used to manually identify problems and resolve them, often too late to make a difference. Automatic detection will allow minimal computing resources to be used to solve a problem in the most efficient and responsive manner possible.

To illustrate clear examples of implementations using computers, this disclosure necessarily refers to accounts, payments, and certain functions using them; the nature of writing computer programs, and the ordinary manner in which skilled software engineers communicate with one another, mandates the use of a description that is at least partly functional. However, all aspects of the disclosure are directed to computer-implemented methods in which one or more elements of a distributed computer system execute stored control programs to perform the functions that are described. All functions described in the disclosure are computer-implemented functions to be implemented in practice using digitally stored programs executing on computers, or other machines, or stored in non-transitory computer-readable media, to provide the technical solutions that are disclosed. All descriptions of functional units and their functions are intended to cover technical solutions to the specified technical problems. This disclosure is not intended to cover, and does not cover, any method of organizing human behavior, any fundamental economic method or principle, or any process that is mentally performed, and any interpretation to the contrary, of the formal claims or other aspects of this disclosure, is unsupported in the disclosure and erroneous.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements. In some embodiments, the networked computer system comprises an e-procurement server computer 102 ("server"), one or more supplier computers 122a-n, one or more buyer computers 112a-m, and one or more data source computers 132, which are communicatively coupled directly or indirectly via one or more networks 118. The designation "122a-n" indicates that any number of supplier computers may be used in various embodiments. "Supplier," in this context, may also mean "seller" in some embodiments. The designation "112*a-m*" indicates that any number of buyer computers may be used in various embodiments.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112*a-m* and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises a payment information management layer 150 that is programmed or configured to host or execute functions including but not limited to receiving and facilitating use of virtual payment card information for use in e-procurement processes.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the payment information management layer 150 can comprise computer-executable instructions, including payment information storage instructions 152, fraud detection instructions 154, and abnormality model generation instructions 156. In addition, the server 102 can comprise a database module 140.

In some embodiments, the payment information storage instructions 152 are programmed to enable collecting and transmitting transactional data or documents, such as payment account information between a buyer entity, an issuing entity such as a bank or credit lender, and the e-procurement service. Specifically, the payment information storage instructions 152 are programmed to enable the intake of transaction information to be used in procurements and the generation of virtual payment card data which is capable of being used on the e-procurement service. For example, an issuing entity such as a bank may directly interact with the e-procurement service on behalf of a buyer account to identify a virtual line of credit or account that the e-procurement service may use for procurement operations requested by the buyer.

In some embodiments, the fraud detection instructions 154 are programmed to enable the detection of abnormal or fraudulent behaviors associated with the viewing or accessing of virtual payment card information. For example, the fraud detection instructions may be programmed to cause a back-end device configured to monitor supplier access behaviors to detect manipulation of the virtual payment card information that is not consistent with typical procurement processes.

In some embodiments, the abnormality model generation instructions 156 are programmed to enable the generation of response models or machine learning processes which continuously improve abnormal access detection and resolution. For example, a model may be continuously updated to approve a certain level of activity for supplier accounts based on input permissible behaviors. The model may then detect, in real time, access behaviors that do not fit the contemporary level of activity approved by the model and responsively cause action to be taken to prevent fraud.

In some embodiments, the database module 140 is programmed or configured to manage relevant data structures and store relevant data for functions performed by the server 102. In association with the payment information management layer 150, the data may include image data relating to one or more aspects of a digital image or properties of an item having a representation in the digital image.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102.

The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102.

A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132a-q broadly represents one or more computers, virtual computing instances, and/or instances of a data management application program with a communication interface. A data source computer 132a is programmed to manage one or more data sources, receive a request for certain data in the one or more data sources from the server 102, and send a response to the request to the server 102. The data source computer 132a can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the payment information management layer 150, the server 102 is programmed to receive or store transactional data, such as virtual payment card data. In other embodiments, the server 102 is programmed to receive or transmit additional transactional data, such as expense reports, from or to one of the buyer computers 112a-112m representing an organization and another one of the buyer computers 112a-112m representing an entity, and similarly from or to one of the supplier computers 122a-112n representing an organization and another one of the supplier computers 122a-122n representing an entity. The server 102 is programmed to also store such transactional data in association with the appropriate accounts in a storage device, such as the data repository 140.

Such transactional data may include raw data associated with a chargeable expense account owned by the buyer and operated by an issuing entity such as a bank or credit card supplier. The server 102 is programmed to further receive additional data from the data source computers 132a-q that can be used to assess the transactional data communicated between one of the supplier computers 122a-n and one of the buyer computers 112a-m. The additional data may include industry-wide prices of certain items sold by a supplier account or annual revenue or spending data associated with a buyer account. The server 102 is programmed to also store such additional data in a storage device, such as the data repository 140.

To illustrate clear examples, the subsequent figures discussed herein, and certain other diagrams are discussed in the context of FIG. 1, but other embodiments could be performed using arrangements other than as shown in FIG. 1. Each process diagram or flow diagram herein is intended as a plan, algorithm, or specification for programming one or more computer programs or other software elements to implement the functions that are represented in the diagrams, and is expressed at the same level of detail as customarily used by persons having ordinary skill in the art to which this disclosure pertains to communicate among themselves about software architecture and program flow at development stages before actual coding is undertaken. Furthermore, all functional statements in the description of the figures discussed herein are intended to describe programmed, executable machine operations of one or more of the elements of FIG. 1, unless the context indicates otherwise; that is, the disclosure is directed to particular machines programmed to execute in a particular way to execute or implement the specified functions, and/or digital storage media recorded with executable instructions that can be loaded and executed in a machine to perform the specified functions, and their practical applications, and is not directed to ideas in the abstract, concepts or functions alone.

3. Example Processes for Secure Facilitation of Virtual Payment Card Data

Certain drawing figures are shown in simplified, schematic format for purposes of illustrating a clear example and other embodiments may include more, fewer, or different elements connected in various manners. Various figures are intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

3.1 Viewing Virtual Payment Card Data in Secure Environments

FIG. 2 illustrates a virtual payment security process according to various embodiments. The example process 200 depicted in FIG. 2 may be programmed to execute maintaining a software service that is programmed for facilitating procurement transactions between a buyer account and a supplier account, receiving virtual payment card data sufficient to uniquely identify a particular payment method associated with a buyer account, receiving a request to access the virtual payment card data associated with the method of purchase, storing visual virtual payment card data corresponding to a visual representation of the virtual payment card data, and providing access to the secure storage memory.

Returning to FIG. 2, the process 200 begins at step 210 by maintaining a software service that is programmed to facilitate procurement transactions between a buyer account and a supplier account. In various embodiments the software service is an e-procurement service operated by e-procurement server computer 102. In various embodiments, the buyer account and supplier account are digital accounts operable as part of the e-procurement service by a buyer and supplier entity respectively. The buyer and supplier accounts may be operated through independent buyer and supplier devices, such as buyer computers 112a-m and supplier computers 122a-n respectively. For example, e-procurement server computer 102 may operate and maintain an e-procurement service which is communicable over network 118 by buyer and supplier computers 112a-m and 122a-n to facilitate transactions between the accounts.

In various embodiments, the service is executed, in-part, by instructions, such as those instructions comprising payment information management layer 150. In this manner, the service may comprise payment storage features executed by payment information storage instructions 152, fraud detections features executed by fraud detections instructions 154, and abnormality model generation features executed by abnormality model generations instructions 156. The service may be maintained for an amount of time necessary to complete any conceivable e-procurement process, and may be maintained previous to, concurrent to, or subsequent to any other steps described herein.

At step 220, the process comprises receiving virtual payment card data, the virtual payment card data sufficient to uniquely identify a particular payment method associated with a buyer account. As used herein, virtual payment card data may refer to any data which represents a virtual embodiment of a line of credit or a digital identification card which may be used as part of a transaction, procurement, requisition or other commercial exchange. It will be recognized by those skilled in the art that any kind of transaction data or representative information may be used in lieu of virtual payment card data, which is discussed herein as a likely embodiment. In an embodiment, the e-procurement service receives the virtual payment card data. In a further embodiment, the e-procurement service receives the virtual payment card data directly from an issuing entity, such as a bank or credit card provider. In an alternative embodiment, a buyer account or entity receives the virtual payment card data from an issuing entity before sending it to the e-procurement service. The e-procurement service may use any method necessary to receive the virtual payment card data, and the data may be received in any format or using any protocol necessary to preserve the security of the data.

In an embodiment, the virtual payment card data is received using an electronic protocol, such as commerce eXtensible Markup Language (cXML). A secure electronic protocol protects a broad amount of files, data, or information sent using the protocol and may be used to send or receive them in various embodiments. In an embodiment, the virtual payment card data is received as part of a secure email message. In an embodiment, the e-procurement service stores the data responsively after it is received. In an embodiment, the e-procurement system generates new data using the virtual payment card data after it is received. For example, the e-procurement system may use raw virtual payment card data to generate a virtual representation of a credit or debit card which can be used by the buyer, supplier, issuer, or e-procurement service. In an embodiment, a notification is sent to one or more of the buyer, supplier, issuer, or an administrator of the e-procurement service responsively.

In various embodiments, the virtual payment card data is a reference set of data, such as a card or account routing number which corresponds to data from a third party supplier. For example, the virtual payment card data may be data accessible to further view or access secure account information stored separately by a third party. The service may use the third party data to facilitate and complete transactions. For example, an issuing bank may store, on the bank's computer servers, secure account information relating to a payment account accessible to a buyer. The service may then receive virtual payment card data corresponding to a bank's secure account information which the service will use to access and/or manipulate the bank's data. The virtual payment card data in this case is a referencing set of data which is useful to access and use and separate account information from third parties as part of the service's transaction processes.

At step 230, the process comprises receiving a request to access the virtual payment card data associated with the method of purchase. In an embodiment, the request is generated by the supplier using the e-procurement service. For example, the supplier may receive a notification that new virtual payment card data has been generated for a buyer account that has requested a procurement from the supplier. The supplier may then wish to view the virtual payment card data to finalize the procurement process. For example, in response to completing a request or procurement for an item or service, the supplier will use the virtual payment card data to access account information from a third party to request a deposit of transactional funds into a supplier's account. In an embodiment, the e-procurement service receives the request directly from the supplier. In an embodiment, the e-procurement service sends a notification to the buyer that the supplier has requested access to the virtual payment card data in response to receiving the request.

At step 240, the process comprises storing visual virtual payment card data corresponding to a visual representation of the virtual payment card data in a secure storage memory. In an embodiment, the visual virtual payment card data is presented in a format that conveys all the relevant details of virtual payment card data to the supplier. For example, the visual virtual payment card data may be generated to show a digital representation of a physical credit card or debit card which conveys the details of a payment account for the buyer. In an embodiment, the secure storage memory is a secure portion of computer memory operated by the e-procurement server. For example, the e-procurement service may partition a portion of a memory which operates with heightened levels of access security. For example, the secure storage memory may be accessible only by entities which have access to a secure link or file path where the virtual payment card data may be stored. In an embodiment, the secure storage memory is generated in response to receiving the request to access the virtual payment card data. In a further embodiment, the secure storage memory is de-partitioned after the virtual payment card data has been accessed and the data therein is removed.

At step 250, the process comprises providing access to the secure storage memory. In an embodiment, the e-procurement service provides access to the partitioned secure storage memory where the visual virtual payment card data is stored. In a further embodiment, the access is provided to the supplier in response to the supplier requesting access and the visual virtual payment card data being generated. In an embodiment, the e-procurement service generates a notification when an access of the secure storage memory is detected. In a further embodiment, the e-procurement service sends the notification to any one of the buyer, supplier, or the issuing entity in response to detecting the access to the secure storage memory.

Figure 5:
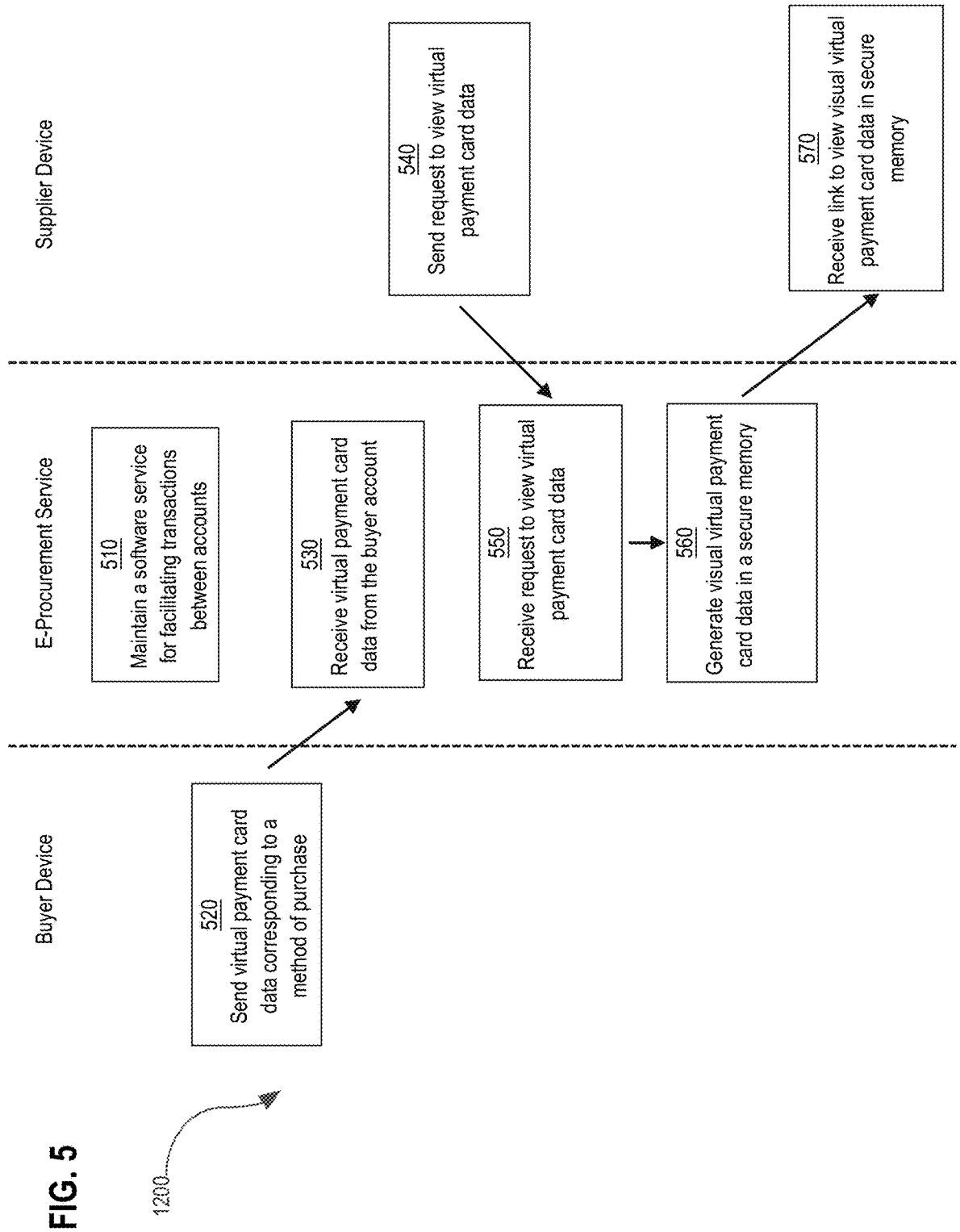
FIG. 5 illustrates a virtual payment security system according to various embodiments.

FIG. 5 illustrates a virtual payment security system according to various embodiments. The example system 500 depicted in FIG. 5 comprises interactions between a buyer device, a supplier device and an e-procurement service operating as an intermediary. In various embodiments, example system 500 facilitates the steps of process 200 on the devices and services discussed herein. Example system 500 operates by maintaining, by the e-procurement service, a software service that is programmed for facilitating transactions between the accounts, sending, by the buyer device, virtual payment card data corresponding to a method of purchase, receiving, by the e-procurement service, the virtual payment card data from the buyer account, sending, by the supplier device, a request to view the virtual payment card data, receiving, by the e-procurement system the request to view the virtual payment card data, generating by the e-procurement system, visual virtual payment card data in a secure memory, and providing, to the supplier device from the e-procurement service, a link to view visual virtual payment card data in the secure memory.

Returning to FIG. 5, the system 500 begins operation at step 510 by maintaining, by the e-procurement service, a software service that is programmed for facilitating transactions between the accounts. As an example, the e-procurement service is a Software as a Service (SaaS) electronic medium over which transactions, requisitions, and procurements can be made. The SaaS e-procurement platform may be generated, maintained, and otherwise facilitated by a server device connected to a network. Buyer and supplier accounts operating as digital entities on separate and distinct buyer and supplier devices may access the platform over the network to facilitate commercial transactions using the platform. For example, a buyer account operated by a human user at a buyer device may access the e-procurement service using a network connected to the buyer device and server executing the SaaS e-procurement platform. The buyer may then browse, select, and begin a procurement process for items offered by various supplier accounts operating on the e-procurement service. The supplier accounts may access the e-procurement service through supplier devices in a similar manner to finalize and complete the procurement processes using digital frameworks offered by the e-procurement service.

At step 520, the system operates by sending, by the buyer device, virtual payment card data corresponding to a method of purchase. For example, as part of the e-procurement process, a buyer operating the buyer account may send particular information over the network directly to the e-procurement platform. The virtual payment card data may link to an account, such as a checking account operated by the buyer with which goods and services may be bought for the buyer. As a further example, the account may be operated and facilitated by a lending agent, such as a bank, and usable by the buyer to access funds and credit used to complete these transactions.

In various embodiments, the virtual payment card data corresponds directly to a payment account and identifies the account directly with the data comprised therein. In various embodiments, the virtual payment card data represents one or more layers of obfuscation of the account. For example, a lending agent such as a bank may generate a unique account number to be used as virtual payment card data, but the unique account number may not correspond directly to an account. Instead, the unique account number is resolvable only by the bank as representing a different account which will be charged on behalf of a buyer. In this manner, lending agents and buyers may continuously generate unique virtual payment card data without ever directly disseminating actual identifying account information.

At step 530, the system operates by receiving, by the e-procurement service, the virtual payment card data from the buyer account. For example, the e-procurement service may receive the virtual payment card data from the buyer account over the network. In various embodiments, the e-procurement service provides a dedicated portion or portal on the e-procurement SaaS platform for entering virtual payment card data. For example, the e-procurement service may contain a software package that allowed a buyer to access the e-procurement service and enter information directly into one or more fields designed to intake the virtual payment card data. The data is then immediately received by the e-procurement service and stored in the service's memory. The e-procurement service may receive the data in any manner necessary to cause receptions and use of the virtual payment card data.

At step 540, the system operates by sending, by the supplier device, a request to view the virtual payment card data. For example, a buyer may begin a requisition process for a supplier's goods using the e-procurement service and offer particular virtual payment card data to complete the transaction. The supplier may need to access the buyer's virtual payment card data to charge an account before the requisitioned items can be sent to the buyer. As a result, the supplier may request that the e-procurement service allow the supplier access to the virtual payment card data to perform a transaction. In various embodiments, the e-procurement service offers the ability to request access to virtual payment card data directly through its service. For example, a supplier accessing information on the e-procurement service may send a request to the e-procurement service, through a software-based front-end interface, to view the relevant virtual payment card data.

At step 550, the system operates by receiving, by the e-procurement system, the request to view the virtual payment card data. The request may be received through the e-procurement service if it was generated by the service originally. For example, as described above, when the supplier sends a request through the service front-end interface, the request may be concurrently generated and received by the service.

At step 560, the system operates by generating by the e-procurement system, visual virtual payment card data in a secure memory. For example, all requests to view virtual payment card data may be designated sensitive information by the e-procurement service and thus must be viewed in a secure environment. In an embodiment, the e-procurement service partitions a portion of memory to create a secure network-accessible service memory on which a visual representation of the virtual payment card data can be viewed. For example, the virtual payment card data may be converted into a viewable format and placed onto a secure memory which is only accessible via a secure protocol, such as an encrypted file or network address link.

At step 570, the system operates by providing, to the supplier device from the e-procurement service, a link to view visual virtual payment card data in the secure memory. Upon accessing or resolving the link, the supplier account is redirected to the memory containing the visual virtual payment card data.

In various embodiments not pictured in FIG. 2 and FIG. 5, the virtual payment card data may be paired with purchase order or invoice data to be displayed concurrently to a supplier account or entity. For example, the visual virtual payment card data may be paired with a relevant visual purchase order receipt or visual invoice which is the subject or a procurement request using the virtual payment card data. Concurrently showing the visual virtual payment card data along with the purchase order and/or invoice information allows a supplier to better determine and resolve crucial elements of a transaction without the need for multiple secure memories to be partitioned or revisited.

In various embodiments not pictured in FIG. 2 and FIG. 5, input of virtual payment card data for a buyer or an issuing entity may be automatically associated with a supplier. For example, the buyer or issuing entity may specify at creation of a virtual card that the virtual card is only to be used by a particular supplier entity. In various further embodiments, inputting the virtual payment card data into the e-procurement service may trigger a notification that a particular associated supplier is or is not associated with an account hosted on the e-procurement service.

Figure 6:
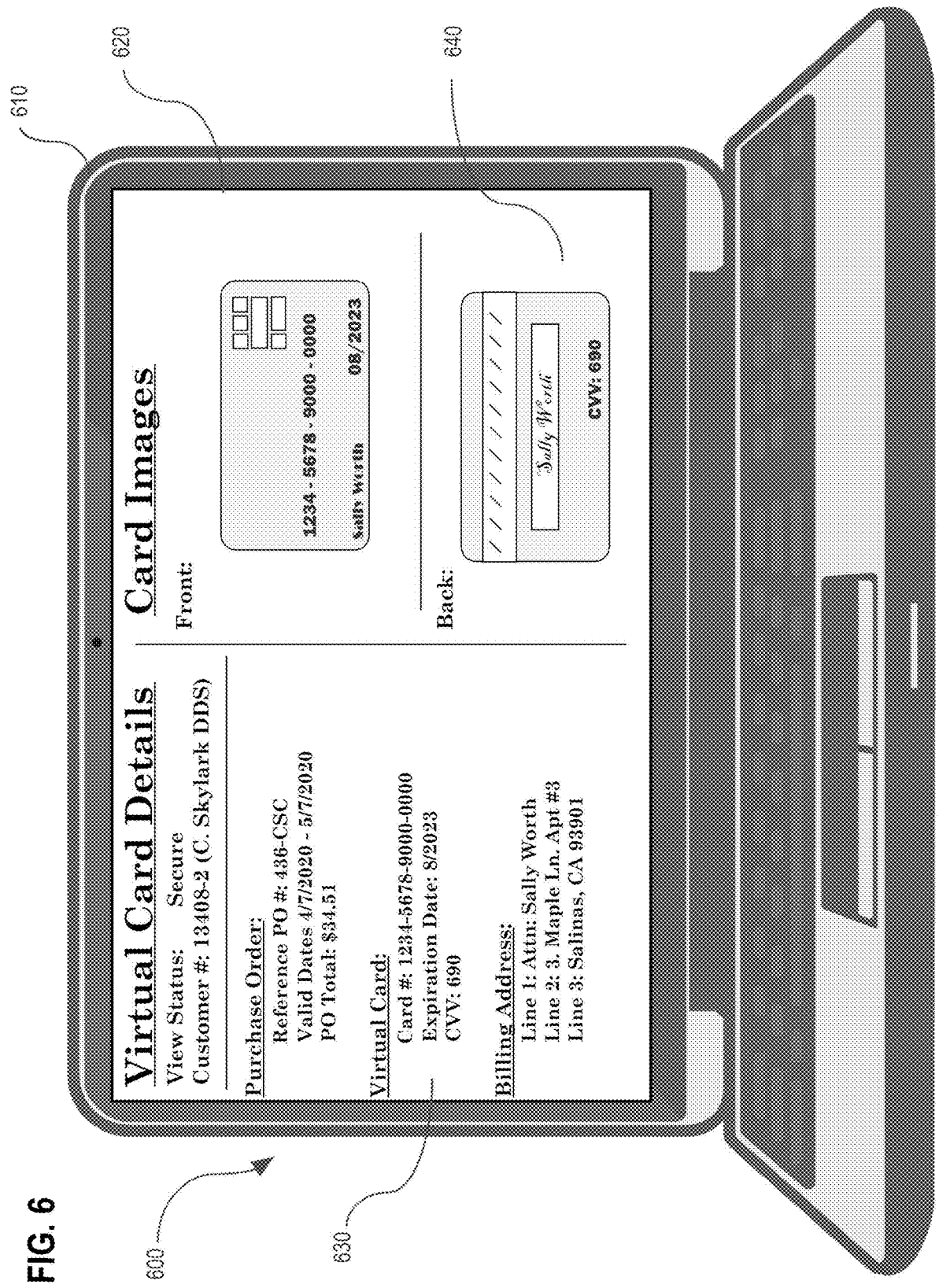
FIG. 6 illustrates an example graphical user interface for viewing virtual payment card and purchase order data according to various embodiments.

FIG. 6 illustrates an example graphical user interface for viewing virtual payment card and purchase order data according to various embodiments. In various embodiments, example interface 600 is a possible result of process 200 and/or system 500 as described herein. As depicted in FIG. 6, example interface 600 comprises visual device 610. Visual device 610 may be a device on which visual virtual payment card data may be viewed as part of resolving a procurement request through the e-procurement service. In an embodiment, visual device 610 is similar to one or supplier computers 122a-n and operable by a human to advance e-procurement processes. For example, interface 600 shows visual device 610 as a laptop computer operable by a human user. Visual device 610 may utilize visual screen 620 on which information, including visual virtual payment card data, may be shown. For example, visual screen 620 is a part of the laptop computer functioning at visual device 610 and provides visual data for interacting therewith. Visual screen 620 may display various aspects of transaction data such as payment details 630 and virtual card visualization 640.

Payment details 630 may convey any aspect of a procurement, requisition, transaction, or any other e-procurement process relevant to the viewing of virtual payment card data. As an example, FIG. 6 depicts information associated with a purchase order that is the subject or a transaction using virtual payment card data. As depicted in FIG. 6, visual screen 620 shows a heading of VIRTUAL CARD DETAILS with various information depicted thereupon. In an embodiment, a field such as VIEW STATUS may depict the status of a secure storage memory storing visual virtual payment card data. For example, FIG. 6 depicts that status as SECURE, meaning the virtual payment card data is being viewed in a secure storage memory, therefore enforcing safety protocols in place at the e-procurement service. A CUSTOMER #, or customer number, as depicted in FIG. 6, may additionally show a unique identifier associated with a buyer account which owns the account corresponding to the viewed virtual payment card data. For example, FIG. 6 depicted the customer number to be a unique string of 13408-2, which corresponds to a buyer account named C. SKYLARK DDS which may be involved in procurement activities with the viewing seller.

Payment details 630 may also contain details for the virtual payment card data including information on a relevant purchase order, information for a generated virtual card, or a billing address associated with the virtual payment card data. For example, information seen in payment details 630 lists a heading of a PURCHASE ORDER. The PURCHASE ORDER field is populated with data relevant to a subject purchase order, including a reference number, valid dates during which the account may be charged for the purchase order, and a total currency cost of the purchase order. The heading of VIRTUAL CARD is populated with details such as a unique routing number for the buyer's payment account, as well as an expiration date of the reference number and an additional security code. As depicted in FIG. 6, such information is sufficient to generate a virtual representation of a credit or debit card, which will be discussed further below. Payment details also includes a BILLING ADDRESS field, which is populated with relevant information corresponding to an address at which a buyer account may be charged for a procurement using the virtual payment card data.

Virtual card visualization 640 may comprise any data necessary to convey a visual representation of virtual payment card data readable by a supplier entity. For example, FIG. 6 depicts virtual card visualization 640 as a two-sided credit card comprising the visual card information, billing address information and additional information associated with a virtual payment card data. The presentation of virtual payment card data as a visual credit card allows a supplier to confirm the authenticity of a payment method presented by the buyer and conveys a normalized and detailed representation of the information to a human user. In various embodiments, the virtual card visualization is generated using information available from payment details 630 and other relevant information. For example, the card number, expiration date, and CVV code are taken from the VIRTUAL CARD field of payment details are shown on the card. The name of the designated buyer SALLY WORTH is also displayed on the card. However, other details such as chip/code information and designated buyer signature may be generated directly from the existing data or other data associated with the buyer account.

3.2 Altering a Graphical User Interface for Viewing Virtual Payment Card Data

Figure 7:
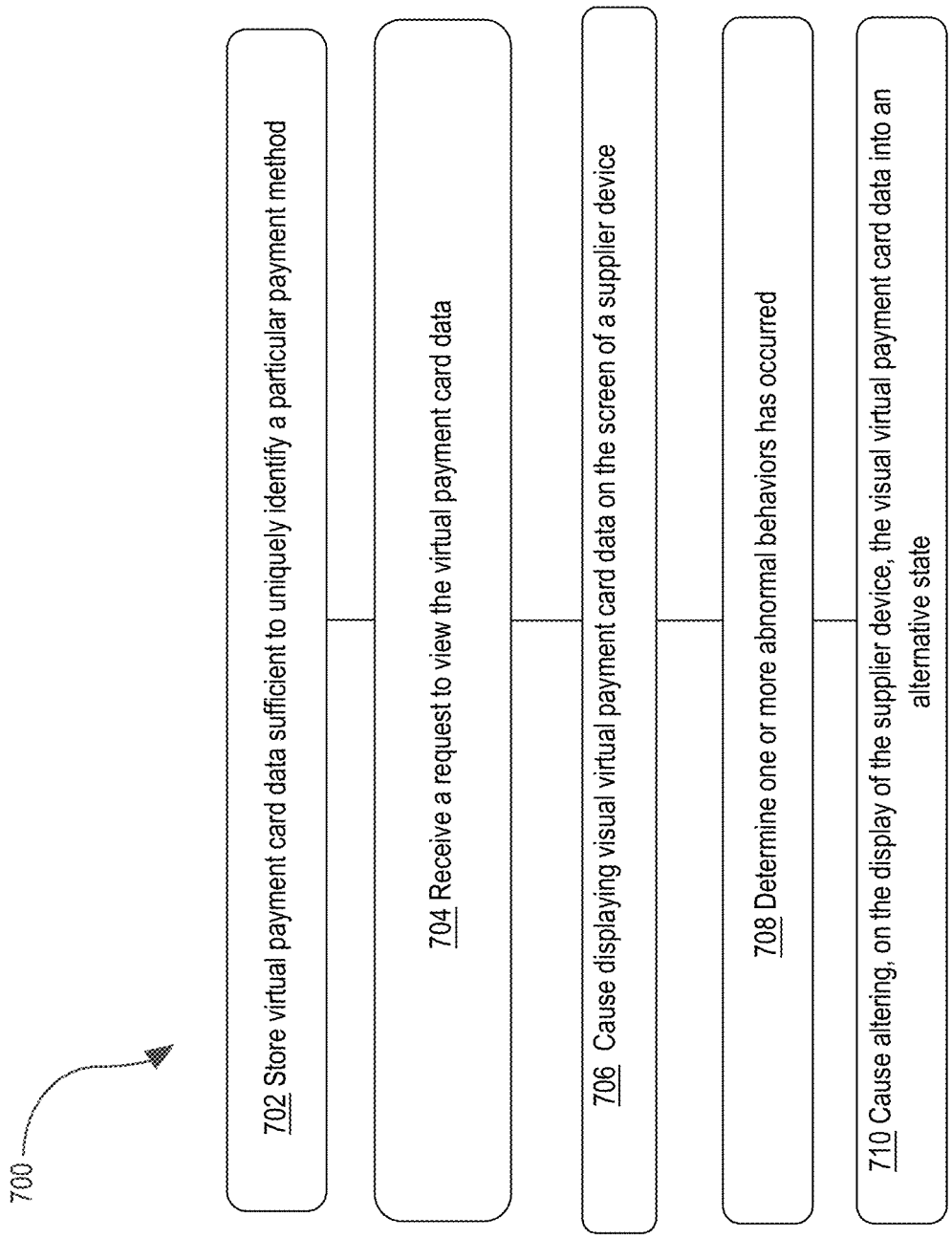
FIG. 7 illustrates a virtual payment security process according to various embodiments.

FIG. 7 illustrates a virtual payment security process according to various embodiments. The example process 700 depicted in FIG. 7 comprises storing virtual payment card data sufficient to uniquely identify a particular payment method, receiving a request to view the virtual payment card data, causing displaying visual virtual payment card data on the screen of a supplier device, determining one or more abnormal behaviors has occurred, and causing altering the visual virtual payment card data into an alternative state.

Returning to FIG. 7, the process 700 begins at step 710 by storing virtual payment card data sufficient to uniquely identify a particular payment method. In various embodiments, the storing of virtual payment card data may be similar or different than the processes described with respect to FIG. 2. In an embodiment, the virtual payment card data is only stored if there is data sufficient to uniquely identify a particular payment method. For example, a payment method may only be identified if a certain amount of information is conveyed in virtual payment card data. With respect to a virtual representation of a credit card, various information must be received to identify the credit card, such as a sixteen-digit credit card number, an expiration date, a security code and other identifying information. In an embodiment, an issuing entity may be notified if sufficient information has not been stored. For example, an issuing bank or a buyer may be notified if missing information is not detected in the virtual payment card data and a request for the missing information may be made.

At step 720, the process comprises receiving a request to view the virtual payment card data. The request to view the virtual payment card data may be similar to other processes described herein, including in FIG. 2. In an embodiment, the e-procurement service receives a request from a supplier to view virtual payment card data necessary to facilitate a transaction, requisition, or procurement from a buyer.

At step 730, the process comprises causing displaying visual virtual payment card data on the screen of a supplier device. In an embodiment, displaying the virtual payment card data is performed in response to receiving the request to view the virtual payment card data. In further embodiments, displaying the virtual payment card data on the screen of the supplier device is performed only after the e-procurement service grants permission for the supplier device to view the virtual payment card data. For example, in response to receiving the request to view the virtual payment card data, the e-procurement service verifies that the supplier account has permission to view the virtual payment card data before allowing display of the visual virtual payment card data on the supplier device. In an embodiment, displaying visual virtual payment card data comprises sending a link or secure access permission to the supplier device to view visual virtual payment card data stored by the e-procurement service.

At step 740, the process comprises determining one or more abnormal behaviors has occurred. The one or more abnormal behaviors may be associated with the particular method of viewing the visual virtual payment card data or another action or behavior taken during the viewing. As an example, the e-procurement service may detect that one or more abnormal activities have taken place while the supplier accessed the visual virtual payment card data for viewing. As another example, the e-procurement service may detect that one or more abnormal activities have taken place while the supplier was currently viewing the visual virtual payment card data. Further examples of abnormal behavior will be discussed in detail below.

At step 750, the process comprises causing altering the visual virtual payment card data into an alternative state. In an embodiment, the visual virtual payment card data is displayed in a first format and the alteration state is a second format that is different than the first. In an embodiment, the alteration of the state of the virtual payment card data is performed in response to detecting the one or more abnormal behaviors has occurred. In a further embodiment, the alteration is based on the detected abnormal activity. For example, a supplier viewing particular visual virtual payment card data for an extended period of time may be indicative of a supplier that has forgotten to terminate the viewing of the data. As a result, the e-procurement system may alter sensitive displayed virtual payment card data to disappear from the screen slowly after a certain amount of time has passed.

Abnormal behaviors detected by the process may include any behaviors, actions, accesses, requests, or invoices, either inside or outside of the e-procurement service, which indicate a potential security or malicious hazard. Examples of abnormal access behaviors include, but are not limited to, accessing the virtual payment card data over an unsecured connections, attempting to access the virtual payment card data outside of the e-procurement service, accessing the virtual payment card data on more than one supplier device, accessing the virtual payment card data for a very brief period of time before exiting, attempting to route a link to the virtual payment card data to another location, viewing multiple distinct instances of virtual payment card data in a short period of time, viewing the same instance of virtual payment card data too many times in a short period of time, and/or accessing the virtual payment card data almost immediately after a notification that the data is available has been sent.

Examples of abnormal behaviors occurring during a viewing process include, but are not limited to, viewing the virtual payment card data for an extended period of time, attempting to screenshot the virtual payment card data with the supplier device or another device, attempting to move the virtual payment card data off of the secured viewing connection, attempting to digitally copy the virtual payment card data, and/or opening a new viewing instances of the same or different virtual payment card data. Examples of abnormal behaviors occurring outside of the accessing or viewing process include detecting an attempted access from outside of the e-procurement service, detecting an attempted access by a party or account which should not have access to the virtual payment card data, detecting multiple charges occurring using the virtual payment card data both inside or outside of the service, detecting an abnormal number an irregular amount of items requested as part of a procurement, and/or attempting to access buyer information for an obsolete or insolvent buyer account.

FIG. 8 illustrates a virtual payment security system according to various embodiments. The example system 800 depicted in FIG. 8 comprises interactions between a buyer device, a supplier device and an e-procurement service operating as an intermediary. In various embodiments, example system 800 facilitates the steps of process 700 on the devices and services discussed herein. Example system 800 operates by maintaining, by the e-procurement service, a software service for facilitating transactions between accounts, sending, by the buyer device, virtual payment card data corresponding to a method of purchase, receiving, by the e-procurement service, data from the buyer device, viewing, by the supplier device, the virtual payment card data on a display, determining, by the e-procurement service, whether the actions taken by the supplier are abnormal, and altering on the supplier device, the view screen, based on the abnormal behavior detected.

Returning to FIG. 8, the system 800 begins operation at step 810 maintaining, by the e-procurement service, a software service for facilitating transactions between accounts. For example, the e-procurement service may contain various front and back-end software and hardware components which work to facilitate e-procurement transactions as described herein.

At step 820, the system operates by sending, by the buyer device, virtual payment card data corresponding to a method of purchase. The method of purchase corresponds to a financial account or entity operable by the buyer or an issuer to exchange goods and services from a supplier for physical or digital currencies.

At step 830, the system operates by receiving, by the e-procurement service, data from the buyer device.

At step 840, the system operates by accessing, by the supplier device, the virtual payment card data on a display. The accessing may be similar to other processes described herein or different. For example, accessing the virtual payment card data may comprise viewing the data in a visual medium and may comprise viewing a similar interface comprising the virtual payment card data as is depicted in FIG. 6.

At step 850, the system operates by determining, by the e-procurement service, whether the actions taken by the supplier are abnormal. Examples of abnormal actions are described above and may correspond to any behavior or action which is not normal procedure during an e-procurement process. In various embodiments, the e-procurement service recognizing abnormal behaviors have occurred is dispositive of a potential security breach or malicious action which may compromise the virtual payment card data. For example, the e-procurement service may automatically detect that one or more abnormal activities have occurred before, concurrent with, or subsequent to the accessing of sensitive data such as virtual payment card data.

At step 860, the system operates by altering, on the supplier device, the view screen, based on the abnormal behavior detected. In various embodiments, the alteration is automatically performed by the e-procurement service in response to detecting that an abnormal behavior has occurred. In further embodiments, the e-procurement service may determine a best or most-efficient alteration to perform to protect sensitive information. As an example, if the abnormal behavior detected is an extended period of time of viewing, it is possible that a supplier forgot to exit the secured storage memory when viewing the visual virtual payment card data. In this case, locking down and voiding the virtual payment card data may be the safest option but would require the replacement of the virtual payment card data at great cost to the buyer, supplier, and issuing entity. As an alternative, the e-procurement service may recognize that slowly altering the visual virtual payment card data to become transparent over time may be the most efficient option.

In various embodiments not pictured in FIG. 8, the view screen of the supplier device further comprises one or more "screenshot indicators" which ensure that screenshots are not taken of the virtual payment card data while it is being displayed. For example, the visual virtual payment card data may comprise a symbol or code corresponding to a webpage hosted by the e-procurement server. Modern devices which can take pictures or screenshots may be executed such that scanning or snapshotting the symbols or codes will cause automated access of a webpage or file path corresponding to the symbol or code. The webpage or file may detect an access, thus confirming that a screenshot or scan has been made by the device. In various embodiments, in response to detecting that the webpage or file path has been accessed, one or more of the preventative actions may be performed to protect the integrity of the purchase method associated with the virtual payment card data.

Figure 9A:
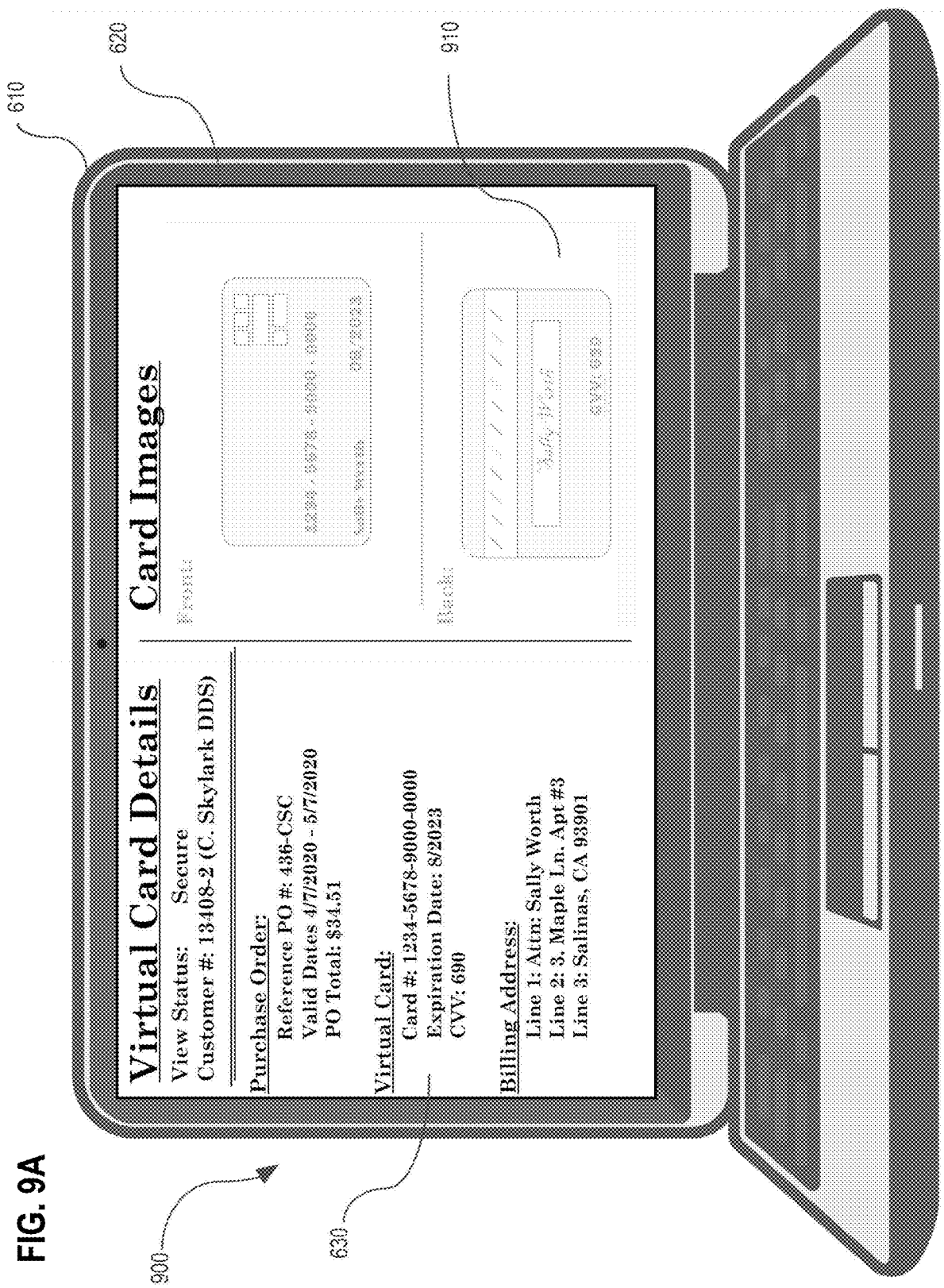
FIG. 9A illustrates an example graphical user interface for viewing virtual payment card and purchase order data according to various embodiments.

FIG. 9A illustrates an example graphical user interface for viewing virtual payment card and purchase order data according to various embodiments. Specifically, FIG. 9A depicts an alternative form of the graphical user interface illustrated in FIG. 6. Example interface 900 depicts visual device 610, visual screen 620 and payment details 630 as depicted in FIG. 6. Faded virtual card visualization 910 shows a fading version of virtual card visualization 640. Faded virtual card visualization 910 may convey the visual state of visual virtual payment card data as depicted on a screen once an alteration has begun. As an example, when a viewing supplier account has not interacted with the visual device 610 during the viewing operation for an extended period of it, the e-procurement service may determine that the most efficient alteration may be transitioning the virtual card visualization to a gradually transparent state over time.

If a viewing supplier has not properly exited the viewing process in the secure stored memory, the alteration will keep the sensitive virtual payment card data from being viewed by other third parties who happen across visual device 610. In an embodiment, the e-procurement service continues fading the virtual payment card data until a supplier has interacted with the viewed data once again, at which point the e-procurement service may reverse the alteration.

In various embodiments, changing the state of the card information from a view of the supplier can be controlled based on one or more criteria related to the viewing action. For example, a criterion may set a time period or viewing action limit to change the manner in which a supplier may view a card permissively within the service. In various embodiments, changes to a visualization of the virtual payment card data may comprise proactively or automatically taking certain preventive actions to avoid malicious activity. For example, a time limit may be enforce for all supplier views of visualization data to ensure activity in conformity with best practices regardless of the supplier's viewing actions. For example, all visualization data may automatically and proactively be faded from a display after a short period of time regardless of a supplier's viewing activity in the intermediary time period.

Figure 9B:
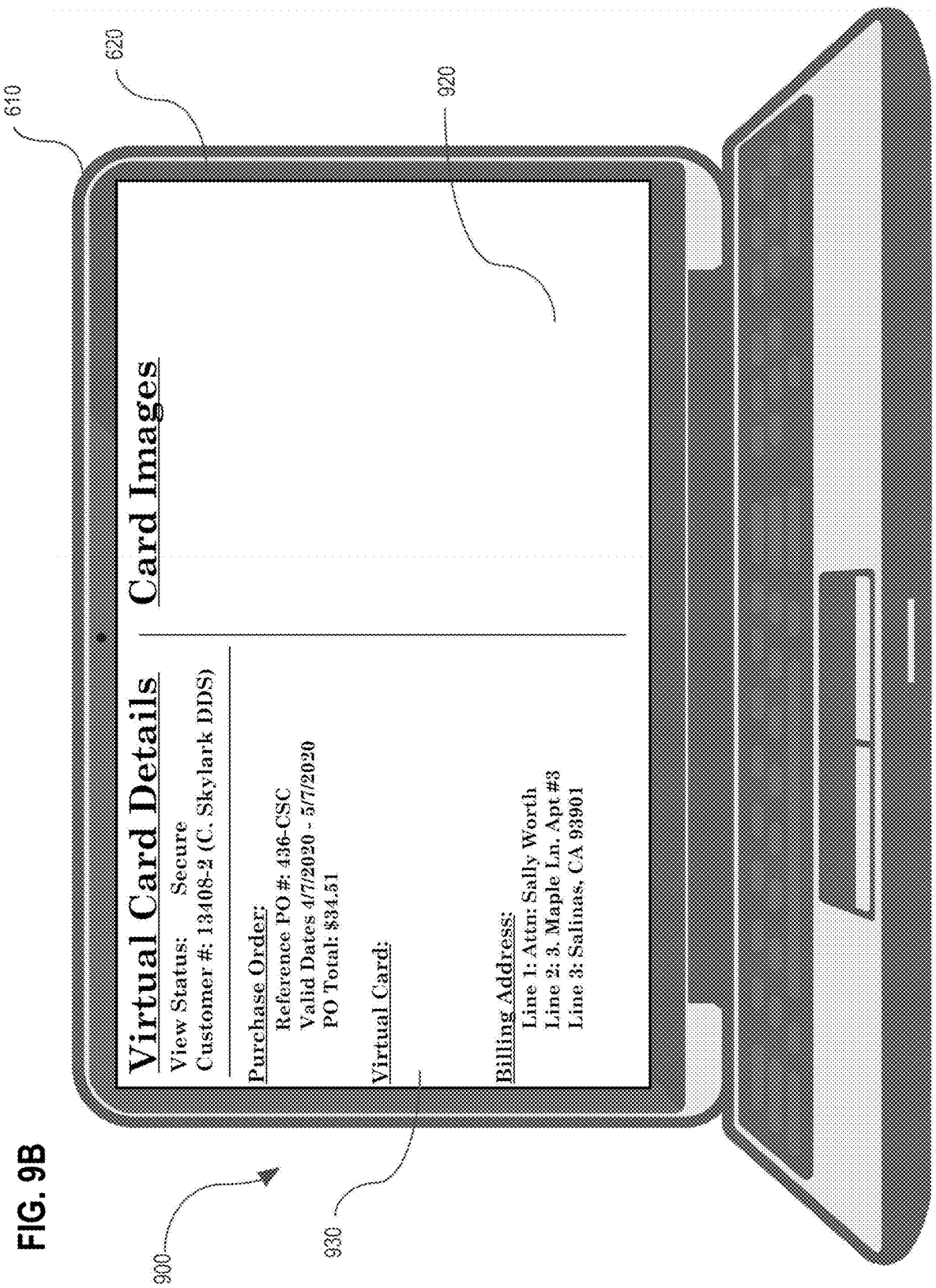
FIG. 9B illustrates an example graphical user interface for viewing virtual payment card and purchase order data according to various embodiments.

FIG. 9B illustrates an example graphical user interface for viewing virtual payment card and purchase order data according to various embodiments. Specifically, FIG. 9B depicts an alternative form of the graphical user interfaces illustrated in FIG. 6 and FIG. 9A. Example interface 900 depicts visual device 610, and visual screen 620. Transparent virtual card visualization 920 shows a fully transparent version of virtual card visualization 640 and faded virtual card visualization 910. For example, after determining that the viewing supplier has not interacted with the viewed virtual payment card data for an extended period of time, the visual virtual payment card data will eventually transition into a transparent state as depicted by transparent virtual card visualization 920.

Corresponding parts of payment details 630 may be similarly redacted as containing sensitive information that should also be hidden from third parties viewing visual device 610. For example, transparent payment details 930 show the portion of the virtual card details relating to the VIRTUAL CARD section fully transparent as well. In this state, third parties may be able to view non-essential information such as the PURCHASE ORDER and BILLING ADDRESS details, but not the sensitive virtual payment card data details. In a further embodiment, the supplier interacting with the visual device 610 will not return the transparent visual information to its original state, and instead the information must be requested to be viewed again. Such a process strikes an efficient balance between supplier account efficiency and security of virtual payment card data.

3.3 Preventing Access to Virtual Payment Card Data in a System

Figure 10:
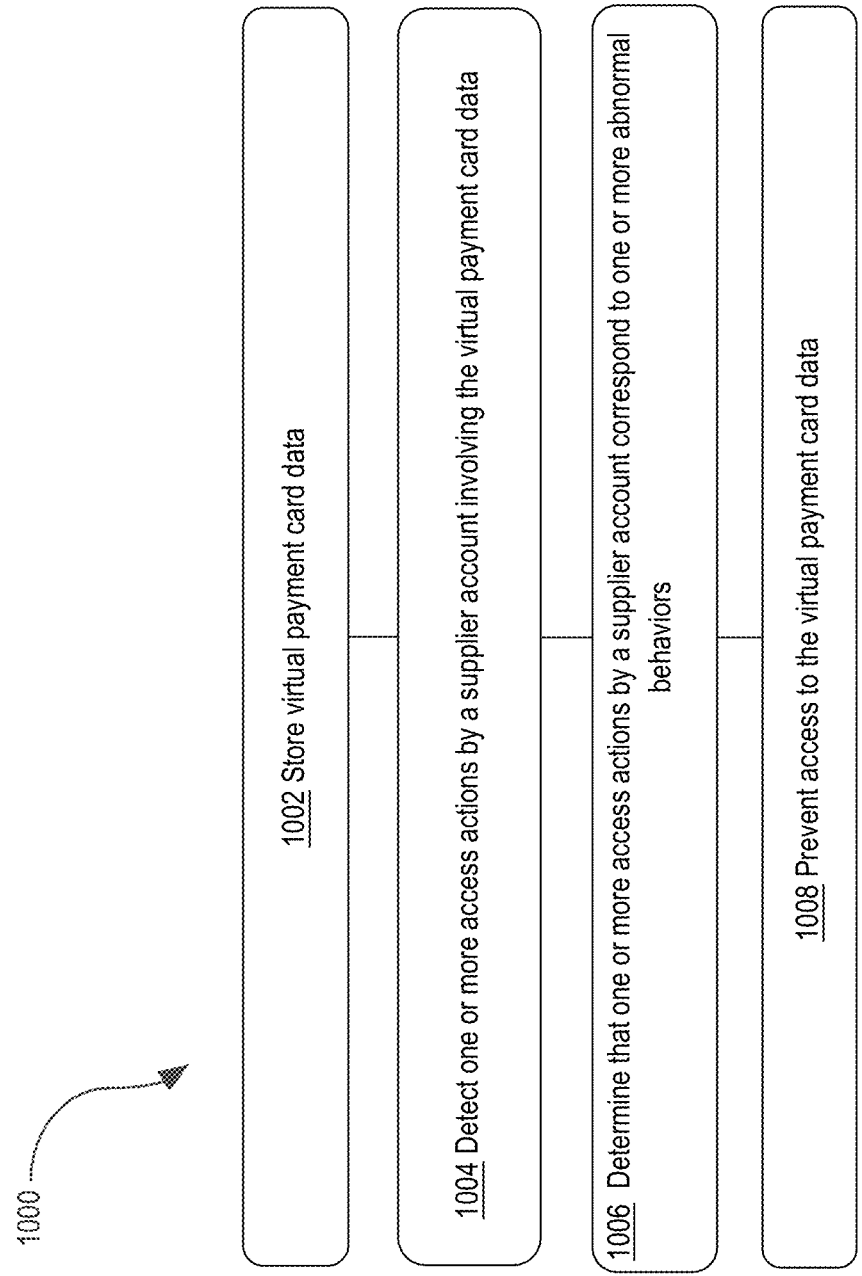
FIG. 10 illustrates a virtual payment security process according to various embodiments.

FIG. 10 illustrates a virtual payment security process according to various embodiments. The example process 1000 depicted in FIG. 10 comprises storing virtual payment data, detecting one or more access actions by a supplier account involving the virtual payment card data, determining that one or more access actions by a supplier account correspond to one or more abnormal behaviors, and prevent access to the virtual payment card data.

Returning to FIG. 10, the process 1000 begins at step 1010 by storing virtual payment data. In various embodiments, storing the virtual payment card data may comprise any of the methods of storing data described herein, including in the previously discussed figures.

At step 1020, the process comprises detecting one or more access actions by a supplier account involving the virtual payment card data. An access action by the supplier account may involve any accessing of virtual payment card data as part of the e-procurement service as described herein, including in the previously discussed figures.

At step 1030, the process comprises determining that one or more access actions by a supplier account correspond to one or more abnormal behaviors. In various embodiments, an abnormal behavior is any behavior not including typical actions or access behaviors typical in an e-procurement system. Examples of abnormal behaviors are discussed above.

At step 1040, the process comprises preventing access to the virtual payment card data. In various embodiments, preventing access to the virtual payment card data is performed in response to determining that one or more access actions by a supplier account correspond to one or more abnormal behaviors. In further embodiments, preventative actions taken correspond to the type of abnormal behavior detected. Examples of preventative actions are discussed in detail below. For example, the abnormal behavior of incurring multiple charges using a single instance of virtual payment card data indicates that a particular buyer payment method is compromised by malicious actors that may be attempting to charge the payment method illegally. A proficient way to prevent illegal charges from occurring is by voiding all payment methods associated with the virtual payment card data and notifying the buyer immediately. Critical abnormal behaviors may require more stringent and protective action than less-important detected abnormalities.

In various embodiments, activity monitoring is done retroactively and regularly by administrators of the service. Regular activity monitoring and behavior grouping is useful for an e-procurement service as it allows administrators to view particular patterns of behavior in a period of time and respond accordingly. Such activities may be retroactively determined model behaviors, such as increased viewing activity of particular cards, increased viewing activity of groups of cards, different accesses of card information from multiple distinct devices, frequent viewing of a multitude of data across a plurality of buyers, and many other factors. As a result, these behaviors can be quantified and flagged so that administrators of a service may detect and respond to such behavior earlier in the procurement process.

Examples of preventative actions that may be taken to counteract abnormal behavior include, but are not limited to, notifying a buyer, supplier, or issuer account of abnormal behavior, blocking supplier access to virtual payment card data, voiding virtual payment card data, preventing charges to an account corresponding to the virtual payment card data, blocking access to one or more accounts, revoking access credentials to the e-procurement service, requiring a new log-in to an account, requiring authentication such as additional password or fingerprint authentication, requiring administrator action, regenerating a virtual payment card, and/or cancelling a virtual payment card.

Figure 11:
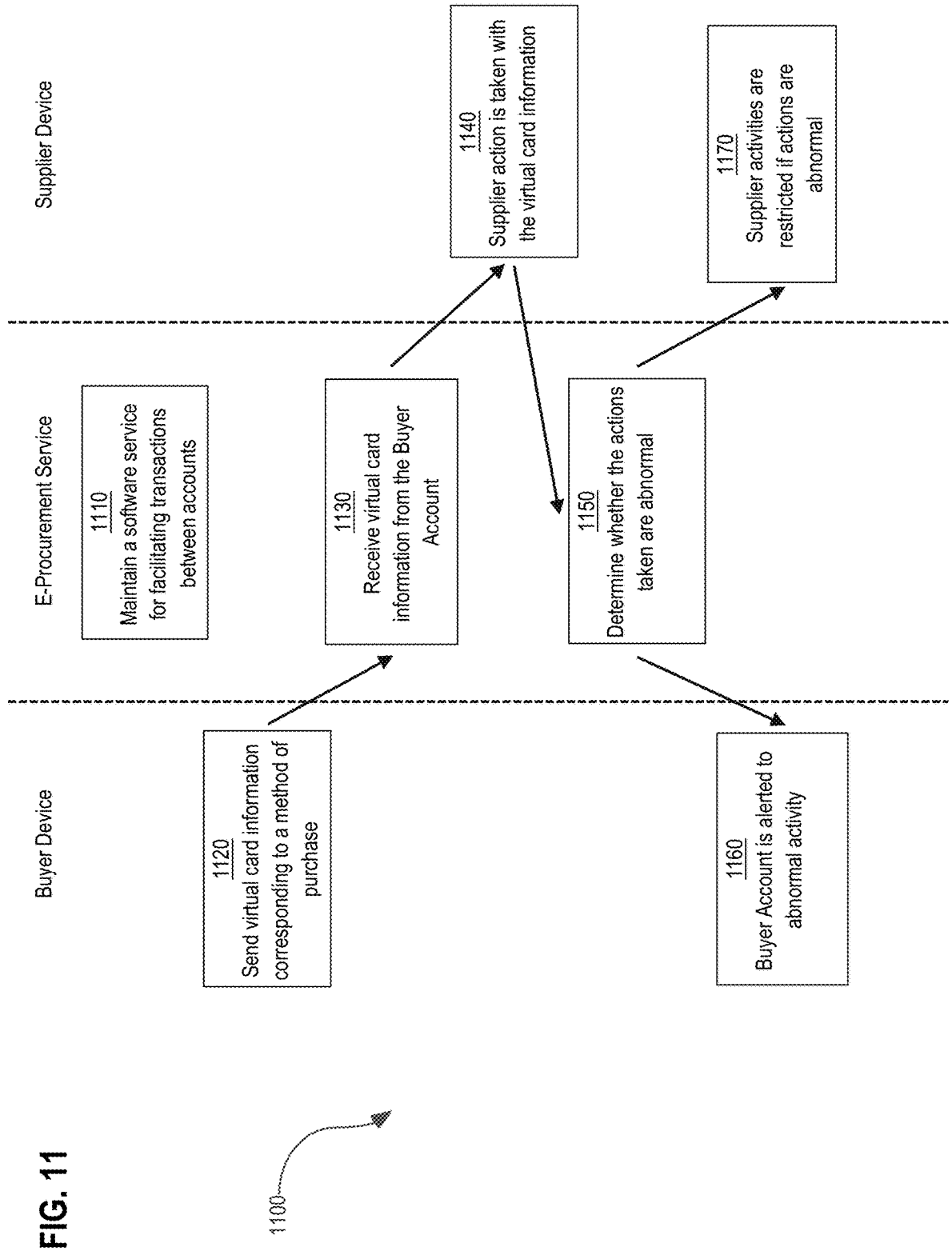
FIG. 11 illustrates a virtual payment security system according to various embodiments.

FIG. 11 illustrates a virtual payment security system according to various embodiments. The example system 1100 depicted in FIG. 11 comprises interactions between a buyer device, a supplier device and an e-procurement service operating as an intermediary. In various embodiments, example system 1100 facilitates the steps of process 1000 on the devices and services discussed herein. Example system 1100 operates by maintaining, by the e-procurement service, a software service for facilitating transactions between the accounts, sending, by the buyer device, virtual card information corresponding to a method of purchase, receiving, by the e-procurement service, the virtual card information, taking action, by the supplier device, with respect to the virtual card information, determining, by the e-procurement service, whether the actions taken by the supplier device are abnormal, alerting, by the e-procurement service, the buyer device to abnormal activity and restricting, by the e-procurement service, supplier activities if the actions are determined to be abnormal.

Returning to FIG. 11, the system 1100 begins operation at step 510 by maintaining, by the e-procurement service, a software service for facilitating transactions between the accounts. At step 1120, the system operates by sending, by the buyer device, virtual card information corresponding to a method of purchase. At step 1130, the system operates by receiving, by the e-procurement service, the virtual card information. At step 1140, the system operates by taking action, by the supplier device, with respect to the virtual card information. The action may be any kind of action performed at the supplier device, on the e-procurement service platform, or a detected process outside of the regular procurement processes associated with the e-procurement service. At step 1150, the system operates by determining, by the e-procurement service, whether the actions taken by the supplier device are abnormal. For example, the e-procurement service may constantly or periodically monitor actions taken by the buyer account, supplier account, or regular requests and procurement procedures. At step 1160, the system operates by alerting, by the e-procurement service, the buyer device to a detected abnormal activity. The notification may be any kind of notification necessary to convey the existence of an abnormal behavior to a buyer account, and may include a notification sent through the e-procurement service, an email, a pop-up notification, a push notification, an automated response or any other notifying action which conveys the existence of abnormality.

At step 1170, the system operates by restricting, by the e-procurement service, supplier activities if the actions are determined to be abnormal. The restrictive behavior may be any behavior or action which best, or most efficiently, resolves a potential or current security breach with respect to the virtual payment card data. For example, an abnormal behavior may be detected when a supplier charges an abnormal number of transactions to multiple payment accounts for multiple buyers, or charges accounts in a predictable pattern. As a result, it may be inferred that the supplier is misappropriating transactions for multiple buyers virtual payment card data, and those methods of payment should be voided immediately to prevent future harm.

Figure 12:
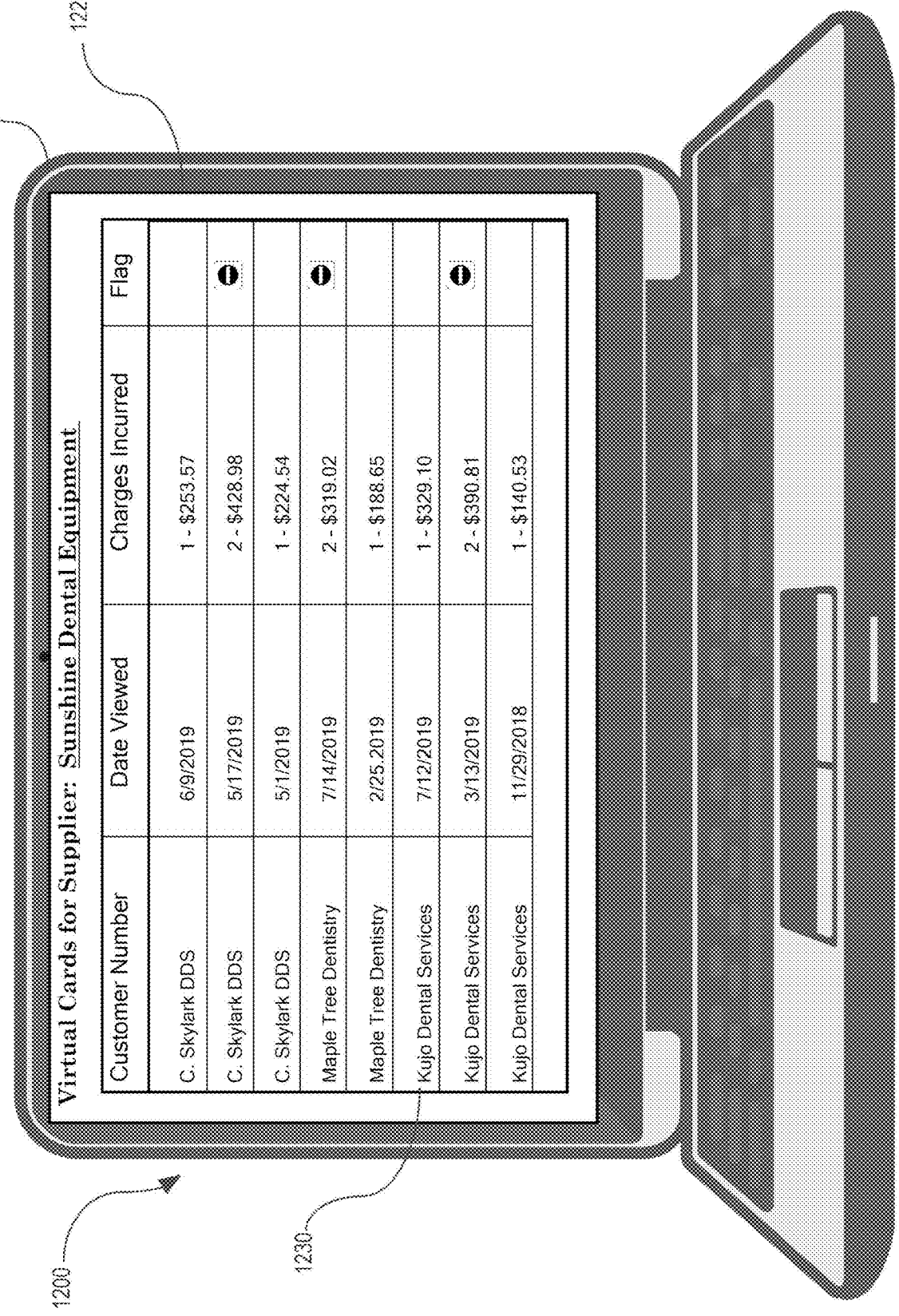
FIG. 12 illustrates an example graphical user interface for viewing abnormal payment access data according to various embodiments.

FIG. 12 illustrates an example graphical user interface for viewing virtual payment card and purchase order data according to various embodiments. Specifically, FIG. 12 depicts an example interface for viewing supplier procurement histories on a purchase order table as part of the e-procurement service. In various embodiments, example interface 1200 is a possible embodiment of process 1000 and/or system 1200 as described herein. The example interface 1200 may be used by the e-procurement service, an administrator of the e-procurement service, or an administrator of a corresponding supplier account.

Example interface 1200 comprises visual device 1210. Visual device 1210 may comprise visual screen 1220, which shows visual data relevant to one or more e-procurement processes to detect possible abnormal behaviors for e-procurement procedures. As depicted in FIG. 12, visual screen 1220 displays elements of purchase orders, such as procurement archive item 1230. Procurement archive item 1230 is one of many archived procurement entries in a table which show a behavioral history of a supplier. More specifically, visual screen 1220 shows a list of procurement transactions for the supplier SUNSHINE DENTAL EQUIPMENT. The list of procurement archive items 1230 has several data fields for each of the items, including a CUSTOMER NUMBER which may display a customer name or number uniquely identifying a buyer who has requested procurements from the supplier. Also included in the items are a DATE VIEWED field indicating the dates at which the virtual payment card data for the particular buyer was viewed by the supplier, a CHARGES INCURRED section showing a number of items procured and a total cost field, and a FLAG field.

In various embodiments, the flag field is a binary property of an item indicating whether the particular charge is associated with a detected abnormal behavior. In various further embodiments, the e-procurement system automatically parses a number of procurement archive items 1230 for a particular supplier and detects whether a historical procurement archive indicates an abnormal behavior. For example, as depicted in FIG. 12, three entries in the chart are flagged, each corresponding to a particular transaction from a different buyer. In each case, the flagged entry involved at least two items procured, an abnormally high total dollar cost of charges incurred, and was the second procurement fulfilled by the supplier. Such behavior may be indicative of a supplier that is fraudulently charging buyer accounts with double the cost for a requisition once the supplier has already completed one procurement with the supplier. In this case, the e-procurement system may flag the entry as being abnormal. In various embodiments, resolving flagged behaviors is done automatically by the e-procurement service. In various embodiments, resolving the flagged behaviors is performed by an administrator of the e-procurement service.

In an embodiment not shown in FIG. 12, the user interface further comprises one or more icons for charging a payment information manually if automatic charging fails. For example, an icon next to a purchase order or invoice may be interacted with to begin a process for manually charging a payment account as an alternative to regular processes of charging an account automatically. In an embodiment not shown in FIG. 12, additional details may be shown in the virtual payment table, including card status, download count. Card status will be discussed in further detail in the subsequent sections herein.

3.4 Generating a Model for Abnormal Behaviors Using Community Activity Data

In various embodiments, the e-procurement service may generate and maintain, as part of the e-procurement service, one or more abnormality detection models for determining and resolving abnormal access behaviors on the e-procurement service. For example, the e-procurement service may generate and continuously update an evolving model for better prediction and resolution of abnormal behaviors present in e-procurement procedures. In an embodiment, the e-procurement service maintains a central model applicable to all buyer and supplier entities. In various embodiments, the e-procurement service maintains multiple models for multiple buyers and sellers. In various further embodiments, the e-procurement service maintains a particular model for certain suppliers involved in a particular industry. In various further embodiments, the e-procurement service maintains a particular model for certain suppliers having a total periodic revenue. In various further embodiments, the e-procurement service maintains a model for each individual supplier.

A model may be any mathematical, algorithmic, structured, procedurally generated, or manually created model which the e-procurement service may utilize to detect and resolve abnormal activities during an e-procurement process. In various embodiments, one or more models are utilized to detect an abnormal behavior occurring during an e-procurement process. In further embodiments, one or more models stores measurements, metrics, patterns, and/or protocols which are permissibility thresholds and are used to define and detect abnormal behaviors. For example, a model for detecting abnormal access behaviors may store a range of permissible rates for accessing virtual payment card data. Specifically, a model may define a range of access-per-minute metrics which correspond to a permissible rate of accesses in a period of time. The range may correspond to a determined rate of accesses that a typical supplier may employ during regular e-procurement processes.

As an example, an actual access rate that is lower than the permissible range may indicate that a supplier is not undertaking regular business operations using the e-procurement platform. Suppliers which do not regularly view virtual payment card data may indicate that a supplier is operating an account for reasons other than conducting regular business operations with buyers. As another example, an actual access rate that is much higher than the permissible range may indicate that a supplier is frequently viewing buyers' cards at unnecessary times, indicating a possible intent to misappropriate buyer virtual payment card data.

In various embodiments, the models are generated and maintained using community data gleaned from a multitude of buyers and sellers. For example, one or more initial models may be generated using data from one or more buyer and seller entities operating in a regular and permissible manner. Continuously, or periodically, the one or more models may be updated with historical or current e-procurement data. For example, the e-procurement service may refine metrics and measurements defined in the models based on the permissible and impermissible behaviors of various buyers and sellers. In various further embodiments different models are generated for different seller entities. For example, sellers performing higher volumes of transactions, such as suppliers that offer cheaper or bulk items for procurement, may be expected to view buyer data at a higher rate than other suppliers. As a result, a model may be generated for these suppliers that allows for a higher rate of virtual payment card data views than other suppliers.

In various embodiments, the generated and maintained model employ machine learning principals to generate and refine the models. In an embodiment, the e-procurement service automatically collects data relating to permissible and abnormal actions. In a further embodiment, the e-procurement service automatically utilizes the collected data to refine the models regularly. In a further embodiment, the models apply the refined models to detect and resolve abnormal behaviors detected as part of the e-procurement processes described herein. In various further embodiments, an administrator of the e-procurement service must approve a model before it is employed to detect abnormal behavior.

3.5 Facilitating a Purchase Order Using Virtual Payment Card Data

Figure 13A:
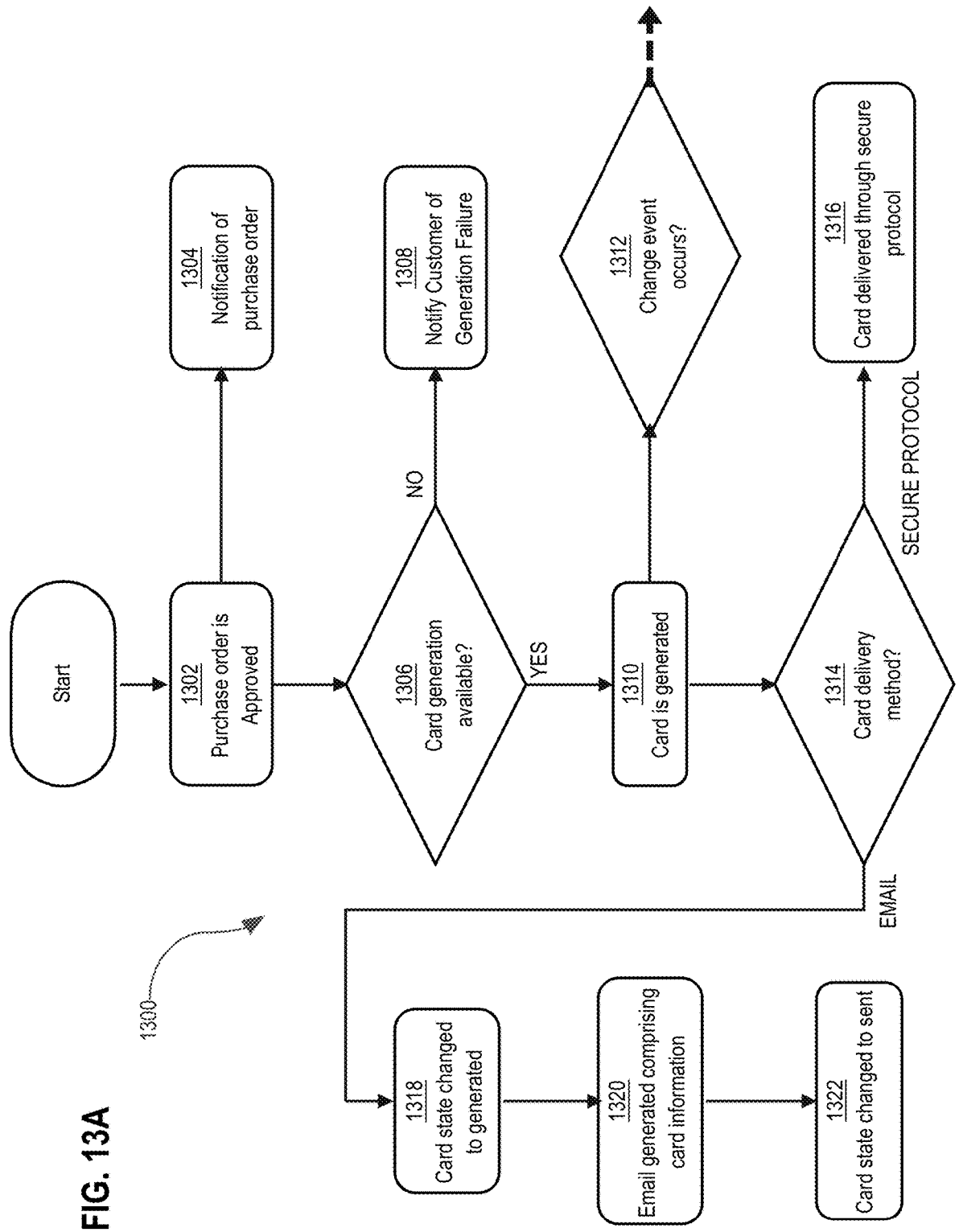
FIG. 13A illustrates an example flow diagram for processing a purchase order using virtual payment card data.

FIG. 13A illustrates an example flow diagram for processing a purchase order using virtual payment card data. Specifically, the flow diagram shows a process for facilitating a purchase order using virtual payment card data. As an example, it may be useful to show a virtual card or other virtual payment card data alongside purchase order information to improve the efficiency and security of an e-procurement transaction. The flow depicted in example diagram 1300 beings at step 1302 by detecting that a purchase order has been approved. In various embodiments, detecting that a purchase order has been approved comprises detecting, by the e-procurement service, that a purchase order for goods and/or services requested by a buyer has been approved by a seller.

At step 1304, a notification is sent that the purchase order has been approved. The purchase order notification may be sent to any of a buyer, a supplier, an issuing entity, or the e-procurement service. At step 1306, a determination is made on whether a generation of virtual payment card data can occur. In various embodiments, virtual payment card data can only be generated if sufficient information has been received from a buyer/issuer to create a digital representation of a payment card. Sufficient information to generate the digital card or virtual payment card data ensures that the purchase order can be completed by charging the corresponding payment account.

Figure 13B:
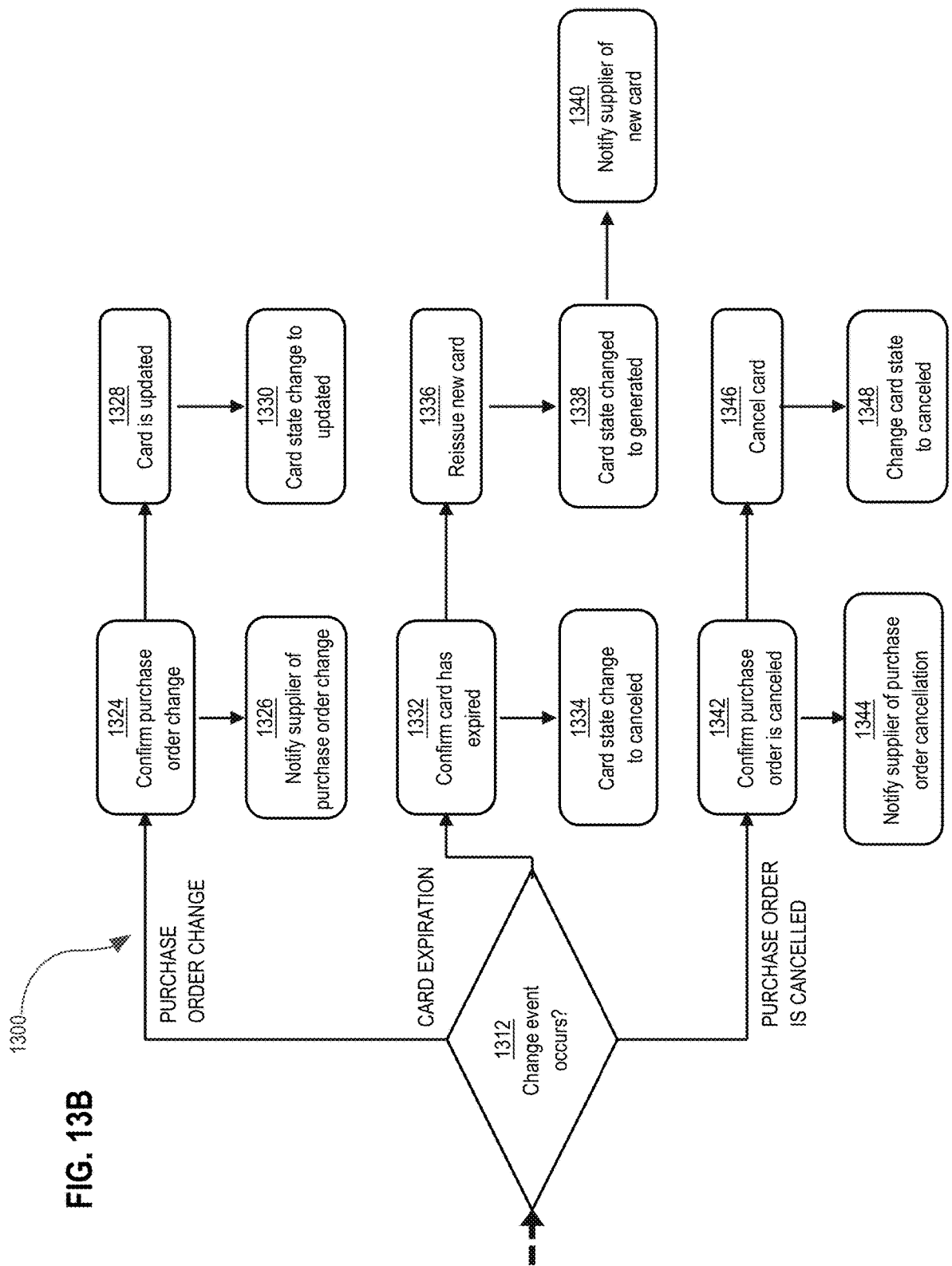
FIG. 13B illustrates an example flow diagram for processing a purchase order using virtual payment card data.

If the generation cannot occur, at step 1308, a customer, buyer, or issuing entity account is notified that generation has failed. In various embodiments, notifying that generation has failed may also comprise notifying an entity of missing information necessary to generate the virtual card. If the generation can occur, at step 1310, the card is generated. In various embodiments, the card is a digital representation of virtual payment card data that is stored by the e-procurement service. After the card is generated, a change in the card or purchase order may occur at step 1312. Responses to a change event at step 1312 is depicted in FIG. 13B. At step 1314, the method of delivery of the virtual payment card data is determined. In various embodiments, the method of delivery refers to the method by which a supplier is given access to the virtual payment card data to complete the purchase order. For example, many mediums may be used for sending the virtual payment card data, including email, direct message, secure protocol, secure webpage paths, and/or file path links, though these methods are not an exhaustive list of the possible mediums.

As a further example, if the card is to be sent via secure protocol, the card is delivered to the supplier in step 1316 using a secure protocol, such as cXML. As another example, if the delivery method is email, a card state tracked by the e-procurement system may first be changed to reflect that the card has been generated. In various embodiments, the e-procurement system may store a state of virtual payment card data to track the status of a virtual card.

In step 1318, the tracked state of the card is set to GENERATED. In step 1320, an email is autogenerated to send to the supplier comprising details which will allow the supplier to view the virtual payment card data. Subsequent to generating and dispatching the email, the card state may then be changed to SENT in step 1322 to signify that the email has been dispatched to the supplier.

FIG. 13B illustrates an example flow diagram for processing a purchase order using virtual payment card data. Returning to step 1312, a change event occurs. The change event may correspond to any event which may alter a purchase order. For example, a change in the purchase order may be detected. An example of a change in the purchase order may be the changes in a quantity of requested items. At step 1324, the change in the purchase order is confirmed. At step 1326, the supplier is notified of the change in the purchase order. The seller may then take some action to refine the purchase order or generate an updated purchase order. At step 1328, the card is updated. In various embodiments updating the card comprises updating the card with new information. For example, an issuing entity may be contacted to update the virtual payment card data to regenerate a valid card. At step 1330, the card state is changed to reflect an updated state.

If the change event is an expiration of the card, the expiration is confirmed at step 1332. At step 1334, the card state is changed to cancelled to reflect that the virtual payment card data is no longer valid. At step 1336 a new card is reissued to replace the expired card. In various embodiments, the card is automatically reissued using similar or different information to represent a valid account. In various further embodiments, the buyer or issuer is notified that a reissue is necessary before the card is reissued. At step 1338, the card state is changed to GENERATED to reflect the reissued nature of the card. At step 1340 the supplier is notified that a new card is available for access as part of a purchase order operation.

If the change event is a cancellation of the purchase order, the cancellation is confirmed at step 1342. At step 1344, the supplier is notified of the order cancellation. At step 1346, the card is cancelled. In various embodiments, cancellation of the card comprises a buyer manually indicating to the e-procurement service that a card should be voided. In various embodiments, cancelling the card comprises voiding the virtual payment card data corresponding to the card for use in the e-procurement service. At step 1348, the card state is changed to cancelled to reflect the voided nature of the card.

3.6 Resolving a Procurement Invoice Using Virtual Payment Card Data

FIG. 14 illustrates an example flow diagram for processing a requisition invoice using virtual payment card data. Specifically, the diagram depicts an example process for generating and resolving an invoice. As an example, it may be useful to show a virtual card or other virtual payment card data alongside an invoice to improve the efficiency and security of an e-procurement transaction. The flow depicted in example diagram 1300 starts at step 1402 by generating invoice details. Invoice details may be any details relating to items procured and amounts to be charged to a buyer account as part of completing an e-procurement process. At step 1404, it is determined whether card generation was successful. If card generation was not successful, at step 1406 the failure to generate the card is confirmed. At step 1408 the customer is then notified of the failure to generate the card. If the generation of the card was successful, it is confirmed at step 1410 that the generation was successful. At step 1412 the card state is changed to generated.

At step 1414, an email is generated and sent to the supplier comprising a method for accessing the card. The methods described herein are not limited to email. For example, an email, push notification, SMS message or other notifying electronic message may be used for the purposes described herein. At step 1416, card state is changed to SENT to represent a dispatch of the email. At step 1418, it is determined whether the card has expired. If the card has not expired, the invoice is generated at step 1420. In various embodiments, the invoice may be dispatched to any of the buyer, the seller, an issuer, the e-procurement service, or any other relevant entities. The completed invoice may comprise the invoice details generated at step 1402. If the card has expired, a new card is issued at step 1422 which may be used to complete the invoice. At step 1424, the card state is changed to GENERATED to represent the issuance of the new card. At step 1426, the supplier is notified that a new card is available to complete the invoice.

In various embodiments, account charges made on an invoice are different than account charges made on a purchase order. For example, an invoice may include multiple accrued purchase orders over a monthly time period instead of an individual purchase order. Payment methods may therefore be different to complete an invoice payment, such as charging multiple purchase orders at once or consecutively. In a further embodiment, multiple payments for an invoice may be resolved using different or distinct virtual payment card data for each payment.

4. Hardware and Software Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
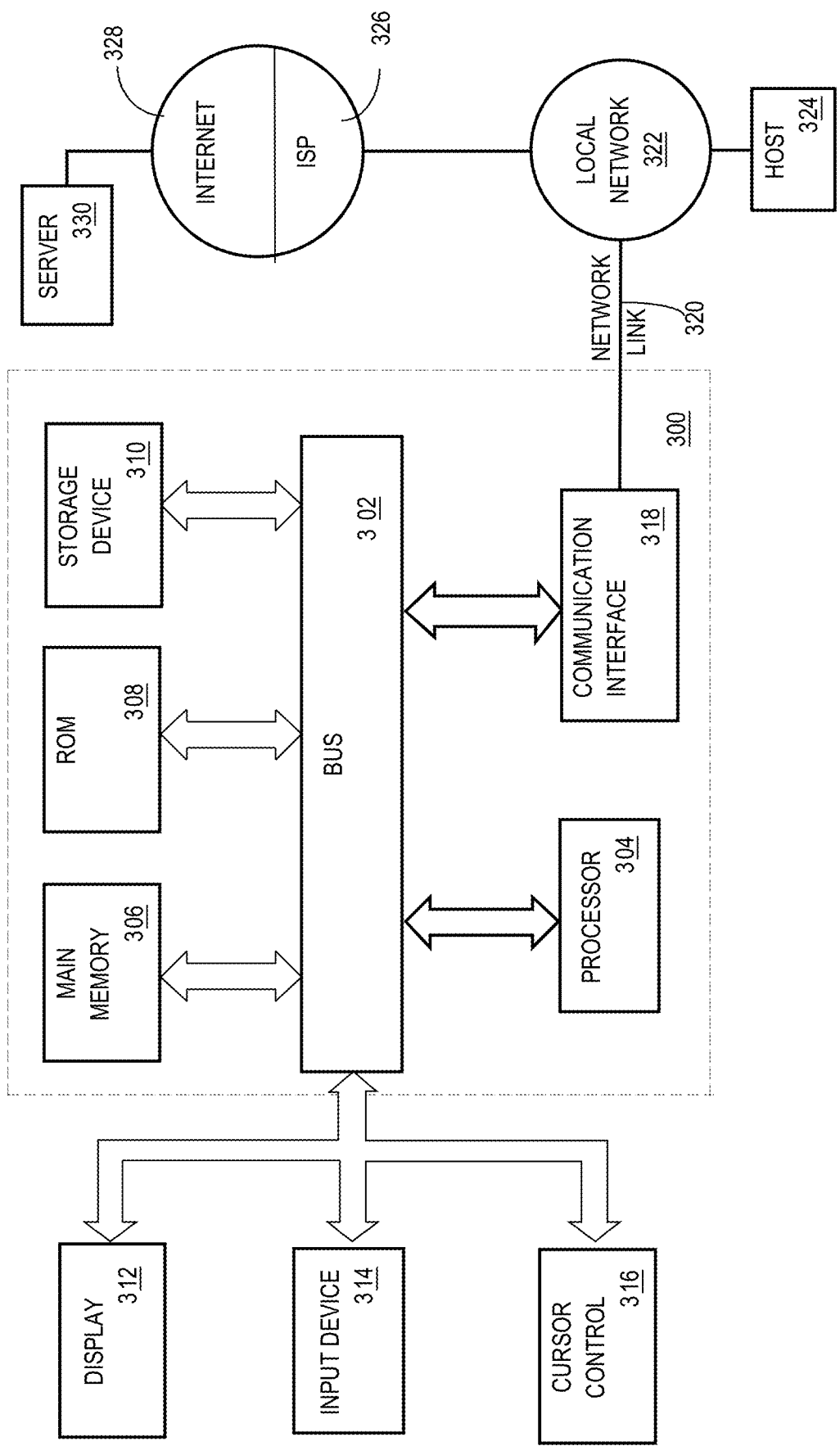
FIG. 3 illustrates an example computer system with which an embodiment may be implemented.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Non-volatile media may also include persistent memory, such as MRAM or PCM, like 3DXPoint from Intel which can be used as a part of main memory. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 930 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Figure 4:
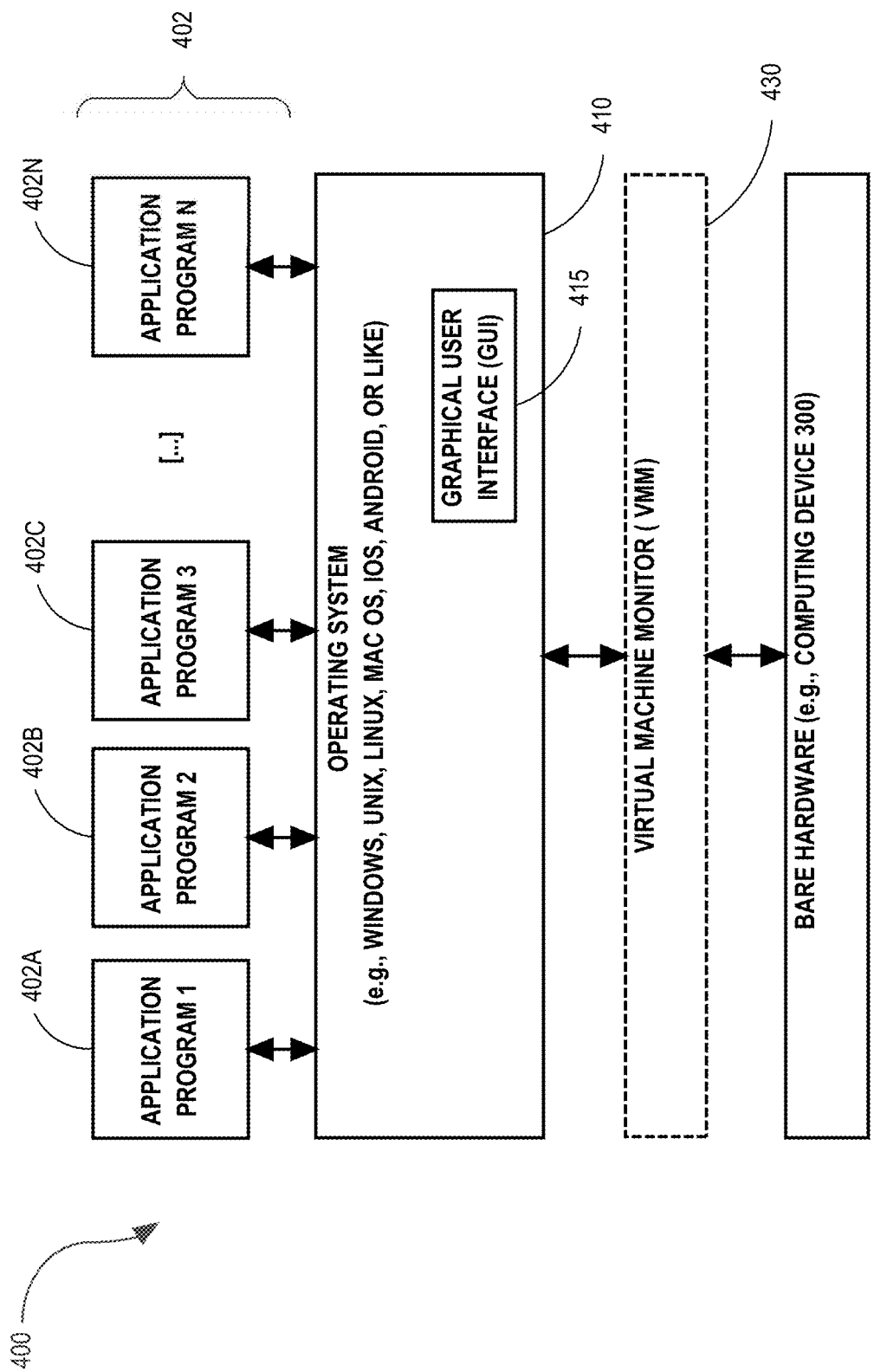
FIG. 4 illustrates an example computer software system with which an embodiment may be implemented.

FIG. 4 is a block diagram of a software system 400 that may be employed for controlling the operation of computer system 400. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 500. Software system 400, which may be stored in system memory (RAM) and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as element 402A, 402B, 402C . . . 402N, may be "loaded" (e.g., transferred from fixed storage into memory) for execution by the system. The applications or other software intended for use on system 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 300 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on bare hardware (e.g., processor(s)) utilizing system 400. Alternatively, a hypervisor or virtual machine monitor (VMM) 430 may be interposed between the bare hardware and the OS 410. In this configuration, VMM 430 acts as a software "cushion" or virtualization layer between the OS 410 and the bare hardware of the system.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware of a system directly. In these instances, the same version of the guest operating system configured to execute on the bare hardware directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described basic computer hardware and software is presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

5. Practical Applications

When considered in light of the specification herein, and its character as a whole, this disclosure is directed to improvements in the intake of virtual payment card data, the secure display of virtual payment card data, and the proactive prevention of malicious actions with regard to the virtual payment card data as part of an e-procurement service. The disclosure is not intended to cover or claim the abstract model of using virtual payment card data to represent a purchase account, but rather, the technical improvements of facilitating optimal manipulation of virtual payment card data on an e-procurement service. By centralizing the utilization of virtual payment card data, the methods and systems described herein reduce technical resource expenditure while greatly improving security processes for vulnerable e-commerce processes. Thus, implementation of the invention described herein may have tangible benefits in increased computer resource utilization, reduction in compromised information flow, and/or improvements in the actual computers and security systems.

Practical applications of various embodiments and methods include receiving and utilizing, and proactively protecting virtual payment card data to facilitate e-procurement operations. A secure software platform is utilized to centralize the use and security of virtual payment card data used as part of e-procurement processes to improve the manner in which e-procurement operations are conducted. Receiving virtual payment card data directly from buyers or issuing entities greatly reduces the resource intensive and security-suspect procedures of "hopping" data back and forth between entities until a transaction is complete. Furthermore, actively modeling and reactively performing security actions which protect the virtual payment card data not only improve the field of e-procurement as a whole, but also provide individual benefits to systems and devices facilitating e-procurement processes.

What is claimed is:

1. A computer-implemented method comprising:
    storing, by a software service executing on a computing device, a first virtual payment card data and a second virtual payment card data, the first virtual payment card data and the second virtual payment card data being sufficient to uniquely identify a particular payment method associated with a first buyer account and a second buyer account;
    detecting, by the software service, one or more access actions by a supplier account involving the first virtual payment card data and the second virtual payment card data;
    determining, by the software service, that the one or more access actions by the supplier account correspond to one or more abnormal access behaviors by determining that the supplier account accessed the first virtual payment card data and the second virtual payment card data during a time period that does not exceed a normality threshold; and
    in response to determining that the one or more access actions correspond to one or more abnormal access behaviors, preventing, by the software service, access to the first virtual payment card data and the second virtual payment card data.

2. The computer-implemented method of claim 1, wherein determining, by the software service, that the one or more access actions by the supplier account correspond to one or more abnormal access behaviors comprises determining that a number of access actions during a time period exceeds an access threshold of abnormality.

3. The computer-implemented method of claim 1, wherein preventing access to the first virtual payment card data and the second virtual payment card data comprises blocking the supplier account from accessing and viewing the first virtual payment card data and the second virtual payment card data at the software service.

4. The computer-implemented method of claim 1, wherein preventing access to the first virtual payment card data and the second virtual payment card data comprises voiding the first virtual payment card data and the second virtual payment card data at the software service by preventing all subsequent transactions involving a virtual card method of purchase indefinitely.

5. The computer-implemented method of claim 1, wherein preventing access to the first virtual payment card data and the second virtual payment card data comprises:
    updating the supplier account, the updating comprising restricting access to the first virtual payment card data and the second virtual payment card data to a designated administrator account associated with the supplier account;
    sending, to the designated administrator account, an indication that one or more abnormal access behaviors has occurred.

6. The computer-implemented method of claim 1, further comprising:
    storing, by the software service, historical access information relating to one or more supplier accounts;
    generating, by the software service, based at least in part on the historical access information, one or more abnormality models, the one or more abnormality models describing the one or more abnormal access behaviors;
    wherein determining, by the software service, that the one or more access actions by the supplier account correspond to one or more abnormal access behaviors comprises determining that the one or more access actions do not match at least an abnormality model of the one or more abnormality models.

7. The computer-implemented method of claim 6, wherein:
    the historical access information is stored automatically as the software service executes on the computing device;
    the one or more abnormality models as generated and updated automatically and periodically based on the historical access information;
    the method further comprises sending, to a software administrator of the software service, the one or more abnormality models;
    the method further comprises approving, by the software administrator, at least an abnormality model of the one or more abnormality models;
    determining that the one or more access actions do not match the at least an abnormality model of the one or more abnormality models comprises determining that the one or more access actions do not match at least an approved abnormality model.

8. The computer-implemented method of claim 1, wherein:
the first buyer account is associated with one or more buyer normality thresholds;
determining, by the software service, that the one or more access actions by the supplier account correspond to one or more abnormal access behaviors comprises determining at least an action of the one or more access actions do not correspond to the one or more buyer normality thresholds.

9. A secure transaction facilitation system comprising:
a computing device executing a software service for facilitating transactions between a buyer account and a supplier account;
a supplier device comprising an electronic digital display screen, the supplier device usable by an operator of the supplier account to access virtual payment card data associated with the buyer account;
wherein the computing device comprises a processor and main memory, the main memory comprising instructions which, when executed, cause:
storing, by the software service, a first virtual payment card data and a second virtual payment card data, the first virtual payment card data and the second virtual payment card data being sufficient to uniquely identify a particular payment method associated with a first buyer account and a second buyer account;
receiving, from the supplier device, a request to view the first virtual payment card data and the second virtual payment card data;
causing displaying, on the electronic digital display screen of the supplier device, visual virtual payment card data corresponding to the first virtual payment card data and the second virtual payment card data in a first visual state;
determining, by the software service, one or more abnormal behaviors has occurred by determining that the supplier account accessed the first virtual payment card data and the second virtual payment card data during a time period that does not exceed a normality threshold; and
causing visually altering, on the electronic digital display screen of the supplier device, the visual virtual payment card data corresponding to the first virtual payment card data and the second virtual payment card data into a second visual state that is different from the first visual state and preventing, by the software service, access to the first virtual payment card data and the second virtual payment card data.

10. The system of claim 9, wherein determining, by the software service, one or more abnormal behaviors has occurred comprises determining that the screen of the supplier device has displayed the visual virtual payment card data for an amount of time exceeding an access time threshold amount.

11. The system of claim 9, the processor further comprising instructions which when executed cause:
causing displaying, concurrently with the visual virtual payment card data corresponding to the first virtual payment card data and the second virtual payment card data, one or more scannable access symbols;
receiving, by the software service, an indication that the one or more scannable access symbols has been scanned by a device different from the supplier device;
wherein scanning the one or more scannable access symbols by a device different from the supplier device is an abnormal behavior;
wherein causing altering, on the electronic digital display screen of the supplier device, the visual virtual payment card data comprises redirecting the supplier device to a different page of the software service.

12. The system of claim 9, wherein causing altering, on the electronic digital display screen of the supplier device, the visual virtual payment card data comprising reducing a visible opacity of the visual virtual payment card data over a period of time until the visual virtual payment card data is invisible on the electronic digital display screen of the supplier device.

13. The system of claim 9, wherein:
determining one or more abnormal behaviors has occurred comprises determining one or more critical abnormal behaviors has occurred, the one or more critical abnormal behaviors corresponding to an imminent security risk;
causing altering, on the electronic digital display screen of the supplier device, the visual virtual payment card data comprising immediately redacting the visual virtual payment card data, in response to determining one or more critical abnormal behaviors has occurred;
the processor further comprises instructions which when executed cause preventing by the system, displaying the visual virtual payment card data for a future period of time.

14. A computer-implemented method comprising:
maintaining, on a computing device, a software service that is programmed for facilitating procurement transactions between a buyer account and a supplier account;
receiving, from the buyer account at the software service, a first virtual payment card data and a second virtual payment card data, the first virtual payment card data and the second virtual payment card data being sufficient to uniquely identify a particular payment method associated with a first buyer account and a second buyer account;
receiving, from the supplier account at the software service, a request to access the first virtual payment card data and the second virtual payment card data associated with a virtual card method of purchase;
storing, in a secure storage memory of the software service, visual virtual payment card data corresponding to a visual representation of the first virtual payment card data and the second virtual payment card data;
providing, to the supplier account, access to the secure storage memory;
determining, by the software service, that one or more access actions by the supplier account correspond to one or more abnormal access behaviors by determining that the supplier account accessed the first virtual payment card data and the second virtual payment card data during a time period that does not exceed a normality threshold; and
in response to determining that the one or more access actions correspond to one or more abnormal access behaviors, preventing, by the software service, access to the first virtual payment card data and the second virtual payment card data.

15. The computer-implemented method of claim 14, further comprising determining that the first virtual payment card data contains at least a threshold amount of data, the threshold amount of data corresponding to an amount of data necessary to form the visual representation of the first virtual payment card data, wherein storing the visual virtual payment card data corresponding to the first virtual payment card data and the second virtual payment card data is performed in response to determining the first virtual payment card data contains at least the threshold amount of data.

16. The computer-implemented method of claim 14, further comprising:
- accessing, by the supplier account, the visual virtual payment card data;
- determining, by the software service, a count of a number of accesses, by the supplier account, of the visual virtual payment card data;
- sending, to the buyer account, an indication that the supplier account has accessed the visual virtual payment card data and the count of the number of accesses.

17. The computer-implemented method of claim 14, further comprising:
- in response to receiving the request to access the first virtual payment card data, generating the secure storage memory by partitioning a portion of computer memory accessible by the software service;
- receiving an indication that the supplier account has accessed the visual virtual payment card data;
- re-partitioning the portion of computer memory to remove the secure storage memory.

18. The computer-implemented method of claim 14, further comprising:
- receiving an indication that the supplier account has accessed the visual virtual payment card data;
- in response to receiving the indication, causing displaying the visual virtual payment card data;
- causing displaying, concurrently with the visual virtual payment card data, visual buyer account information, the visual buyer account information corresponding to data related to the buyer account.

19. The computer-implemented method of claim 18, further comprising:
- receiving an indication of a purchase order performed by the buyer account utilizing the software service and using the virtual card method of purchase corresponding to the first virtual payment card data;
- generating purchase order information corresponding to the purchase order performed by the buyer account;
- sending, to the supplier account, an indication that the purchase order has been performed;
- wherein the visual buyer account information comprises the purchase order information.

* * * * *